(12) United States Patent
Tanase

(10) Patent No.: US 7,246,817 B2
(45) Date of Patent: Jul. 24, 2007

(54) HEAD-PROTECTING AIRBAG DEVICE

(75) Inventor: Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 361 days.

(21) Appl. No.: 10/898,993

(22) Filed: Jul. 27, 2004

(65) Prior Publication Data

US 2005/0029780 A1 Feb. 10, 2005

(30) Foreign Application Priority Data

Aug. 5, 2003 (JP) ............................. 2003-286978

(51) Int. Cl.
*B60R 21/215* (2006.01)
*B60R 21/021* (2006.01)
(52) U.S. Cl. .................... 280/730.2; 280/730.1; 280/728.3
(58) Field of Classification Search ............ 280/730.2, 280/730.1, 728.3
See application file for complete search history.

(56) References Cited

U.S. PATENT DOCUMENTS

| | | | | |
|---|---|---|---|---|
| 6,082,761 | A * | 7/2000 | Kato et al. ............... | 280/730.2 |
| 6,103,984 | A * | 8/2000 | Bowers et al. ........... | 280/730.2 |
| 6,179,324 | B1 * | 1/2001 | White et al. ............. | 280/730.2 |
| 6,254,123 | B1 * | 7/2001 | Urushi et al. ............ | 280/730.2 |
| 6,305,707 | B1 * | 10/2001 | Ishiyama et al. ........ | 280/728.2 |
| 6,336,651 | B1 * | 1/2002 | Mramor et al. .......... | 280/728.2 |
| 6,439,598 | B1 * | 8/2002 | Braun et al. ............. | 280/728.2 |
| 6,460,879 | B2 | 10/2002 | Tanase et al. | |
| 6,485,048 | B2 * | 11/2002 | Tajima et al. ............ | 280/728.2 |
| 6,530,594 | B1 * | 3/2003 | Nakajima et al. ........ | 280/730.2 |

(Continued)

FOREIGN PATENT DOCUMENTS

JP A-9-240409 9/1997

(Continued)

OTHER PUBLICATIONS

Office Communications dated Feb. 16, 2007 issued from Chinese Patent Office for counterpart application No. 2004101027633.

*Primary Examiner*—Paul N. Dickson
*Assistant Examiner*—Timothy Wilhelm
(74) *Attorney, Agent, or Firm*—Posz Law Group, PLC

(57) ABSTRACT

A head-protecting airbag device according to the present invention includes an airbag, a roof rail garnish formed into a single plate shape for covering the interior of the folded airbag, and being provided in its lower edge with a door portion to be pushed by the inflating airbag, and an inflator. These members are assembled into an airbag module and mounted on a vehicle as a single part. The airbag module includes a cover portion located in a back side of the roof rail garnish over the generally entire length of the folded airbag. The cover portion includes a bottom wall extending from an exterior side of the door portion for covering a lower side of the folded airbag, and a side wall for covering an exterior side of the airbag. An upper part of the side wall of the cover portion is joined to an exterior portion of the garnish above the folded airbag. The head-protecting airbag device of the present invention is able to protect the airbag until it is mounted on the vehicle, and is also able to suppress a protruding amount of the roof rail garnish toward the interior when in service.

3 Claims, 21 Drawing Sheets

U.S. PATENT DOCUMENTS

| | | | |
|---|---|---|---|
| 6,719,321 B2 * | 4/2004 | Yasuhara et al. | 280/730.2 |
| 6,722,693 B2 * | 4/2004 | Ikeda et al. | 280/730.2 |
| 6,761,374 B2 * | 7/2004 | Di Sante et al. | 280/728.2 |
| 2001/0022441 A1 * | 9/2001 | Nakajima et al. | 280/730.2 |
| 2002/0017775 A1 * | 2/2002 | Tanase et al. | 280/730.2 |
| 2004/0251663 A1 * | 12/2004 | Heigl et al. | 280/730.1 |
| 2005/0052001 A1 * | 3/2005 | Totani et al. | 280/728.2 |

FOREIGN PATENT DOCUMENTS

| | | |
|---|---|---|
| JP | A-2001-334902 | 12/2001 |
| JP | 2002178870 A * | 6/2002 |

* cited by examiner

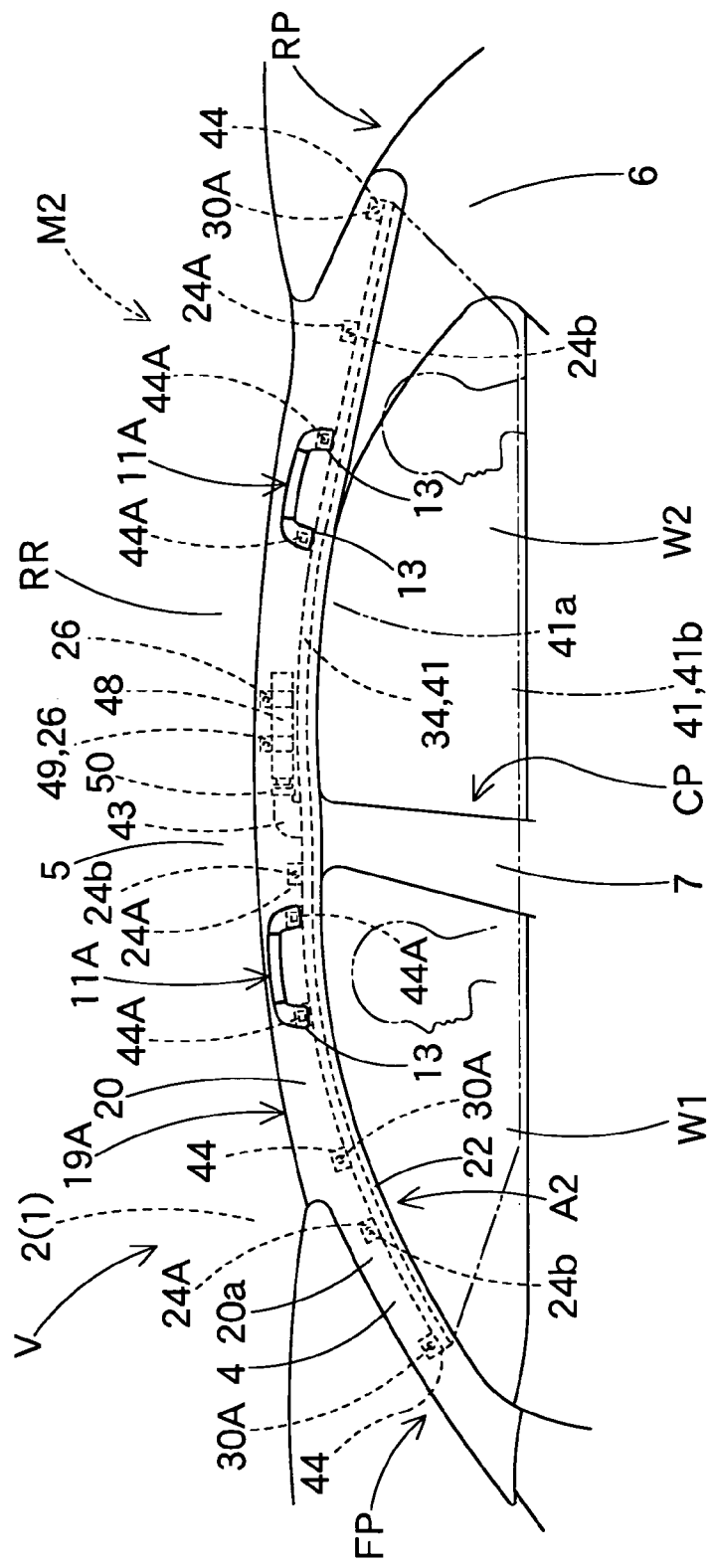

HEAD-PROTECTING AIRBAG DEVICE

The present application claims priority from Japanese Patent Application No. 2003-286978 of Tanase, filed on Aug. 5, 2003, the entirety of which is hereby incorporated into the present application by reference.

BACKGROUND OF THE INVENTION

1. Field of the Invention

The present invention relates to a head-protecting airbag device mountable on an automobile, and more particularly, relates to a head-protecting airbag device in which an airbag, a roof rail garnish for covering the folded airbag, and an inflator for supplying inflation gas to the airbag are assembled into an airbag module and mounted on a vehicle as a single part.

2. Description of Related Art

Conventionally, a head-protecting airbag device of this kind includes a folded airbag, a roof rail garnish, and an inflator for supplying inflation gas to the airbag, as disclosed in Japanese Laid-Open Patent No. 2001-334902 (as will be called "Reference 1").

In this airbag device, an airbag is folded and housed in upper edge of side windows along the front-rear direction. The roof rail garnish is formed into a single plate located in an area extending in the front-rear direction between a roof head lining and side windows, and is provided in its lower edge part with a door portion to be pushed by the airbag and open when the airbag deploys to cover the interior of side windows.

In this airbag device, moreover, the airbag, the roof rail garnish and the inflator are mounted on the vehicle in an integrally assembled state as an airbag module.

Japanese Laid-Open Patent No. 9-240409 (as will be called "Reference 2") discloses, in FIGS. 1 and 2, a head-protecting airbag device mounted on the vehicle as an airbag module in which an entire roof rail garnish opens inward when pushed by the airbag.

However, in the head-protecting airbag device in Reference 1, the folded airbag is assembled into an airbag module with its lower side and exterior side uncovered. Accordingly, after the members are assembled into an airbag module, the airbag module needs such a care as not to damage the airbag in handlings such as storage and transportation until it is mounted on the vehicle.

In the head-protecting airbag device in Reference 2, on the other hand, the roof rail garnish includes an elongate fixing portion extending along the entire length of the folded airbag for holding the airbag by its interior side, and a garnish body for covering the interior side of the folded airbag. When the airbag module is formed, the folded airbag is surrounded by the fixing portion and the garnish body of the roof rail garnish in interior and exterior sides, so that any countermeasures do not have to be considered to prevent damages to the airbag before it is mounted on the vehicle.

However, in the head-protecting airbag device in Reference 2, a whole garnish body in vertical direction opens inward around the upper edge of the garnish body upon airbag deployment. Accordingly, inward protruding amount of the roof rail garnish is too great for this airbag device to be mounted on a vehicle having a small interior space.

SUMMARY OF THE INVENTION

The present invention contemplates to solve the above-mentioned problems, and therefore, has an object to provide a head-protecting airbag device which is capable of protecting an airbag until the device is mounted on the vehicle, and of suppressing inward protruding amount of a roof rail garnish when the device is in service.

The head-protecting airbag device according to the present invention includes an airbag, a roof rail garnish, an inflator for supplying inflation gas to the airbag, and a cover portion. The airbag is folded and arranged inside a vehicle in upper edges of side windows along front-rear direction. The roof rail garnish having a single plate shape is located in an area extending in front-rear direction between a roof head lining of vehicle and side windows for covering an interior side of the folded airbag. The garnish is provided in its lower edge with a door portion to be pushed by the airbag and open when an airbag deploys to cover the interior of side windows. The cover portion is located in a back side of the roof rail garnish over the generally entire length of the folded airbag. The cover portion includes: a bottom wall for covering a lower side of the airbag from an exterior side of the door portion of the roof rail garnish up to the exterior of the folded airbag; and a side wall extending upward from an exterior end of the bottom wall for covering an exterior side of the airbag. An upper part of the side wall is joined to an upper and exterior portion of the roof rail garnish apart from the door portion and above the folded airbag. The airbag, the roof rail garnish, the inflator and the cover portion are assembled into an airbag module to be mounted on a vehicle as a single part.

In the airbag module of the head-protecting airbag device of the present invention, the cover portion formed over the entire length of the folded airbag covers the lower side of the airbag from the exterior side of the door portion up to the exterior of the folded airbag by the bottom wall, and covers the exterior side of the airbag by the side wall. Moreover, the upper part of the side wall of the cover portion is joined to the upper and exterior portion of the garnish away from the door portion above the folded airbag. This joinder prevents the airbag from protruding upward than the side wall, and also prevents the airbag from being interfered with from outside.

In other words, three sides of the folded airbag, i.e., the interior side, the lower side, and the exterior side are covered respectively by the vicinity of the door portion of the roof rail garnish, the bottom wall and the side wall of the cover portion. Moreover, the airbag is shielded from outside by the joints with the roof rail garnish located in the upper part of the side wall, and thus is prevented from being interfered with from outside, and from popping out of the cover portion. Therefore, the airbag is freed from being damaged during transportation.

Joint of the side wall of the cover portion with the roof rail garnish may be formed continuously above the folded airbag, but may also be formed intermittently in plurality as long as the airbag is prevented from popping out.

Moreover, when the airbag deploys after the airbag module is mounted on the vehicle, the roof rail garnish does not open its entire vertical width toward the interior, but opens only the door portion arranged along its lower edge. Accordingly, protruding amount of the airbag toward the interior is reduced.

In the head-protecting airbag device of the present invention, therefore, the airbag is protected until being mounted on the vehicle, and the inward protruding amount of the roof rail garnish is reduced when the device is in service.

It is desired that the cover portion is provided in a position corresponding to a location of a pillar of vehicle with a rib protruded toward the exterior of vehicle and supported by vehicle body. This is because the side wall of the cover portion is pushed toward the exterior forcefully by the airbag when the airbag located above pillars is pushed inward forcefully upon deployment. With the ribs, however, the cover portion is hardly deformed even if pushed by the airbag, and the airbag is able to protrude inward stably.

In a process of assembling the airbag module, it is desired that each of the mounting portions formed along an upper edge of the airbag is attached to the roof rail garnish together with the side wall of the cover portion when the upper part of the side wall is joined to the roof rail garnish.

With this construction, the airbag is attached to the roof rail garnish together when the upper part of the side wall of the cover portion are attached to the garnish, and therefore, number of parts of the airbag module, its working processes and cost are reduced.

In this case, it will be appreciated that the folded airbag is joined only to the roof rail garnish by having its mounting portions attached to the roof rail garnish together with the upper part of the side wall of the cover portion.

This construction is able to omit a work of attaching the airbag directly to the vehicle body.

Of course, it will also be appreciated that the mounting portions formed along the upper edge of the airbag are firstly attached temporarily to the roof rail garnish, and are secured to vehicle body together with the roof rail garnish when the airbag module is mounted on the vehicle.

With this construction, since separate fixing means are not needed for the mounting portions and the garnish, number of fixing parts, processes and cost for the fixing work are reduced, so that the airbag is directly attached to the vehicle body easily, and stably.

In the cover portion, it is desired that an interior end of the bottom wall is joined to an exterior side of the door portion of the roof rail garnish in a separable manner upon airbag deployment, while the upper part of the side wall is joined to the roof rail garnish inseparably upon airbag deployment.

With this construction, the bottom wall of the cover portion is joined to the door portion of the garnish except upon deployment of the airbag, and therefore, it is prevented that foreign bodies intrude from a joint portion of the bottom wall and the door portion. Of course, the cover portion does not fly into the interior space, since the side wall is joined to the roof rail garnish inseparably from the garnish upon airbag deployment.

In this case, it will also be appreciated that the cover portion is integrally molded with the roof rail garnish, and the interior end of the bottom wall and the door portion are joined by a thinned breakable portion.

With this construction, since the cover portion and the garnish are already connected when the airbag module is assembled, the cover portion can be assembled into the airbag module only by an attaching work of the upper part of the side wall to the garnish, so that assembling work of the airbag module is facilitated.

However, if the cover portion is formed separately from the roof rail garnish, the cover portion is replaceable. For example, when the airbag module is applied to a vehicle which has the same interior design in the roof rail garnish but is different in a shape of the vehicle body, the cover portion can be replaced by a cover portion that includes ribs fittable to the vehicle body with a different shape. The fitness of the ribs with a vehicle body having a different shape helps the airbag to protrude inward in generally horizontal direction above a pillar in the initial stage of airbag deployment, and to deploy smoothly without intruding in the exterior of the pillar garnish.

If the cover portion is formed separately from the roof rail garnish, it is desired that the interior end of the bottom wall and the door portion are joined by engaging portions to be engaged with each other.

With this construction, the bottom wall of the cover portion is joined with the door portion of the roof rail garnish except upon airbag deployment, which prevents foreign bodies from intruding from joint portion of the bottom wall and the door portion.

The cover portion may be formed intermittently over the entire length of the roof rail garnish. In other words, the airbag may have cover-free portions in such an extent that the protection of the airbag is secured. With this construction, the airbag in the cover-free portions is able to deploy downward swiftly to cover side windows upon deployment without being interfered with the bottom wall of the cover portion. Therefore, it will be appreciated that the cover-free portion is located in the vicinity of a longitudinal center of side window above the side window so that the airbag may cover the interior of side window swiftly.

The roof rail garnish may be provided in its front end with a portion serving as a front pillar garnish for covering the interior of a front pillar.

With this construction, the roof rail garnish obtains a united interior appearance from the front pillar to the upper side of side windows. Of course, without considering this point, the front pillar garnish may be formed separately from the roof rail garnish.

It will also be appreciated that the airbag module is formed by holding an inflator with a mounting bracket and attaching the mounting bracket to the roof rail garnish. The mounting bracket may further be fixed to vehicle body such that the inflator is supported even more stably.

BRIEF DESCRIPTION OF DRAWINGS

FIG. 11 is a front view of a second embodiment of the head-protecting airbag device according to the present invention in service, as viewed from the vehicle's interior;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
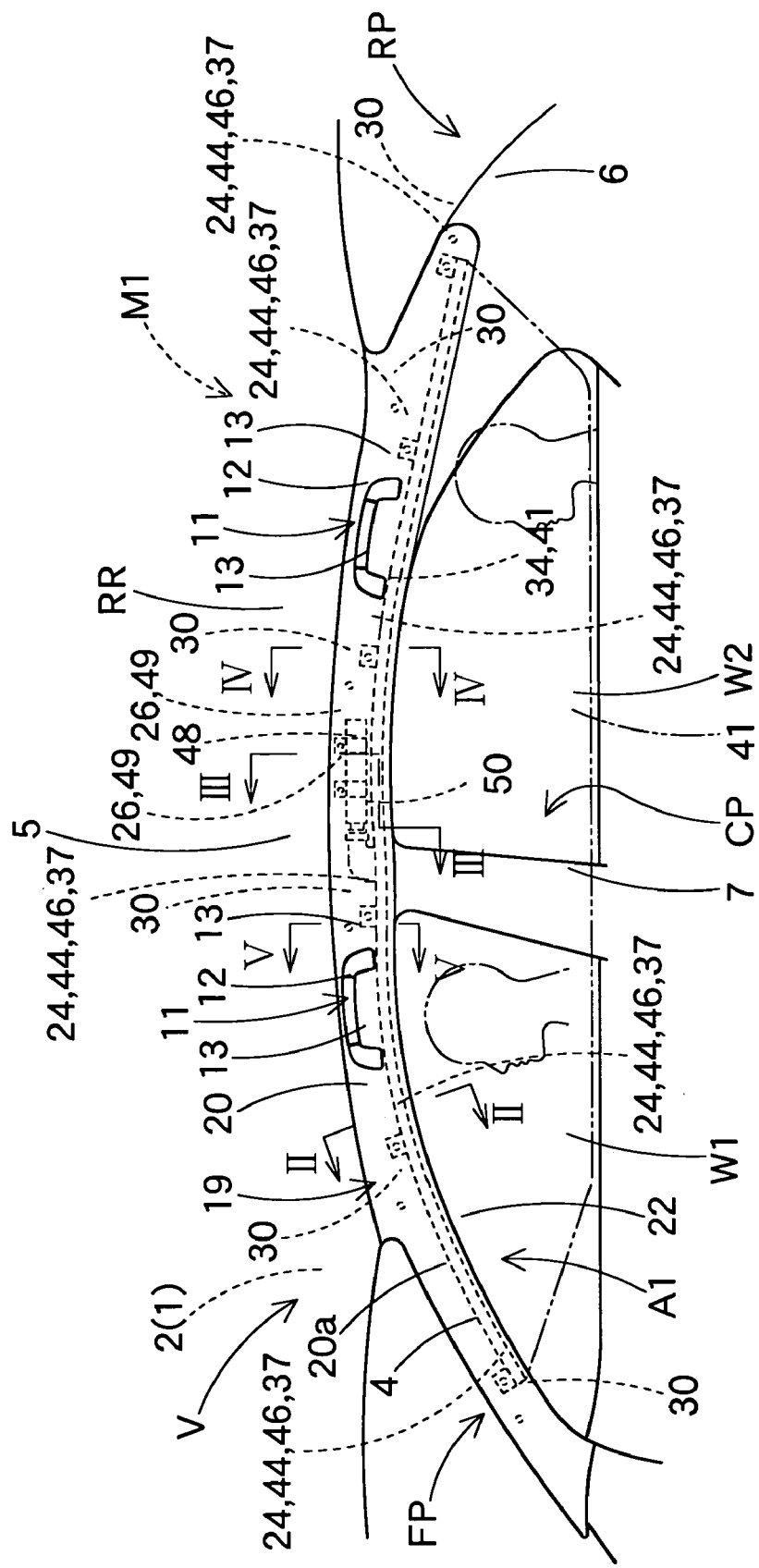
FIG. 1 is a front view of a first embodiment of the head-protecting airbag device according to the present invention in service, as viewed from the vehicle's interior.

Referring to FIG. 1, a first embodiment of the head-protecting airbag device M1 according to the present invention locates a folded airbag 41 elongatively along the upper edges of side windows W1 and W2 inside the vehicle, from a front pillar FP to an upper part of a rear pillar RP, via a roof side rail RR above a center pillar CP or a middle pillar.

Relationships of up-down, front-rear, and left-right in this specification are based on a state of the head-protecting airbag device mounted on a vehicle, and therefore, correspond to up-down, front-rear, and left-right of the vehicle V on which the device is mounted.

The head-protecting airbag device M1 includes an airbag 41, an inflator 48, and a roof rail garnish 19, and these members are preliminarily assembled into an airbag module A1 and mounted on the vehicle V.

Figure 7:
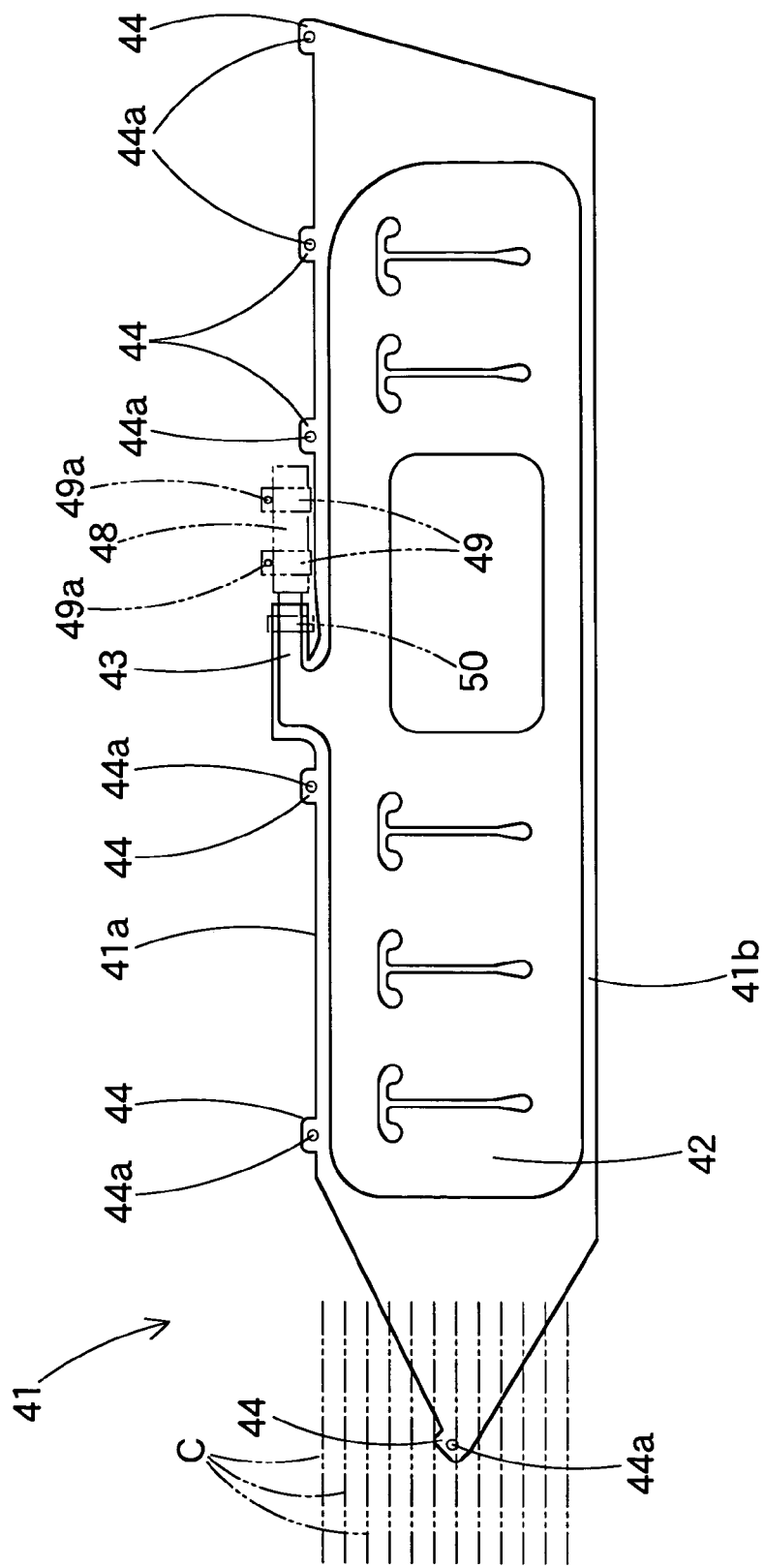
FIG. 7 shows an airbag used in the head-protecting airbag device of FIG. 1 in a flatly expanded state.

The airbag 41 is formed by hollow-weaving method of polyamide, polyester yarns or the like, and includes a gas admissive portion 42 which has a substantially rectangular sheet shape and inflates with inflation gas from the inflator 48, as shown in FIGS. 1 and 7. The airbag 41 is provided along its upper edge 41a with a plurality of mounting portions 44 for attachment of the airbag 41 to the roof rail garnish 19. The airbag 41 is further provided in the middle of the front-rear direction of the gas admissive portion 42 with a tubular joint port 43 extending upward and bent to be joined with the inflator 48.

Figure 2:
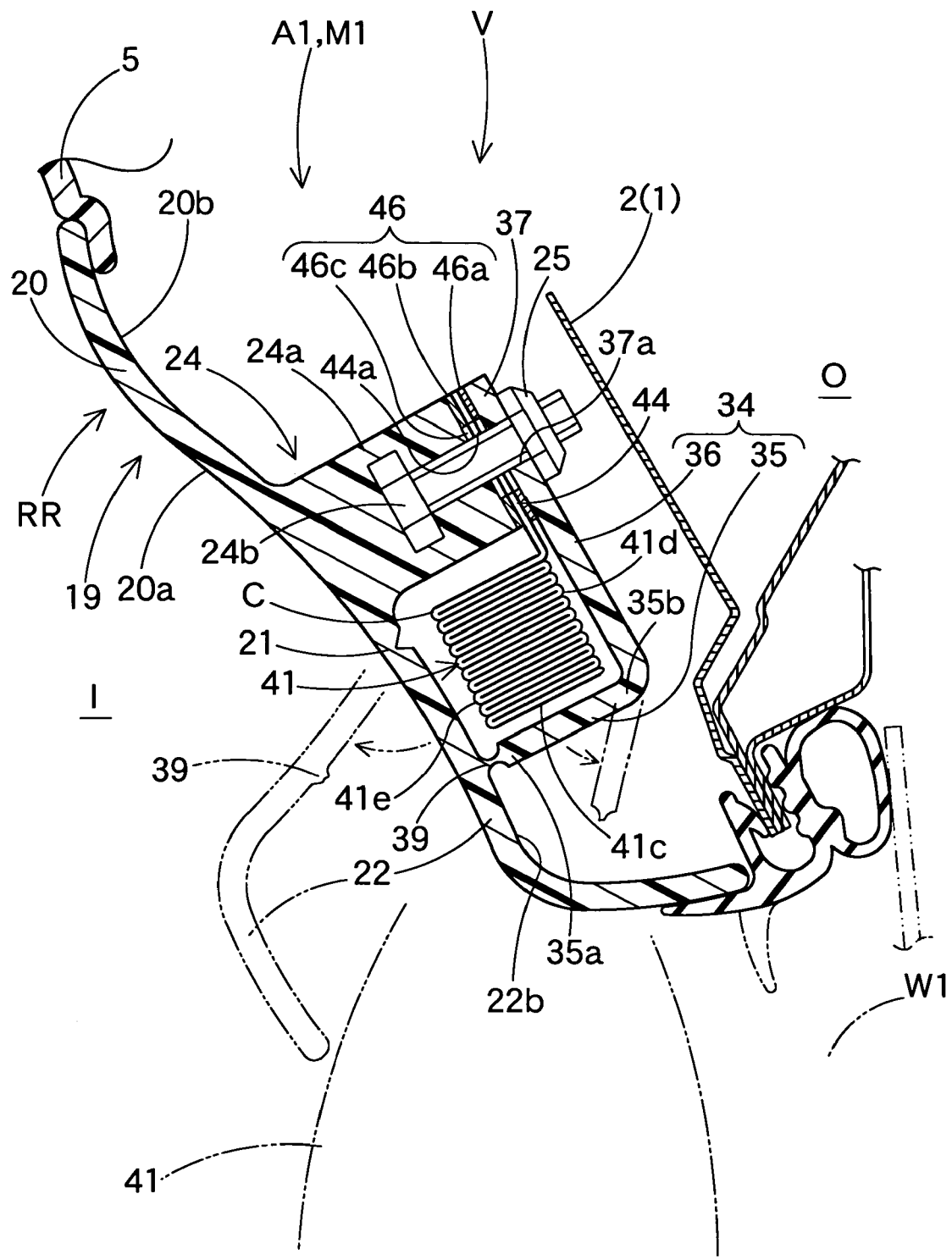
FIG. 2 is a vertical section showing the head-protecting airbag device of FIG. 1 in service, taken along line II-II in FIG. 1.

Each of the mounting portions 44 is provided with a mounting hole 44a, and a mounting bracket 46, as shown in FIGS. 1 and 2, is attached thereto. Each of the mounting brackets 46 consists of two substantially rectangular plates of sheet metal, i.e., an outer and inner plates 46a and 46b which are located at the inner side I and the outer side O of the mounting portion 44, respectively. Each of the plates 46a and 46b has a through hole 46c shaped correspondingly to the mounting hole 44a. The plates 46a and 46b are attached to each of the mounting portions 44 by being plastically deformed to protrude partially either toward interior or exterior with the mounting portion 44 put therebetween. Each of the mounting portions 44 is then secured to an attaching seat 24a of an attaching portion 24 of the roof rail garnish 19 by putting an embedded bolt 24b through the mounting hole 44a and the through holes 46c and screwing the bolt 24b into a nut 25.

As shown in FIGS. 1, 3, 7, and 8, the inflator 48 is joined with the joint port 43 of the airbag 41 by a cramp 50, and is secured to the roof rail garnish 19 by two mounting brackets 49 made of sheet metal. Each of the mounting brackets 49 has an annular shape for holding the inflator 48, and is secured to an attaching seat 26a of an attaching portion 26 of the roof rail garnish 19 by putting an embedded bolt 26b through a mounting hole 49a located in an upper end part of the bracket 49 and by screwing the bolt 26b into a nut 27. When attached to the roof rail garnish 19 by the brackets 49, the inflator 48 is supported at the lower side by a supporter 28 of the roof rail garnish 19.

Referring to FIG. 1, the roof rail garnish 19 is located along the front-rear direction of the vehicle V between a roof head lining 5 and side windows W1 and W2. In the foregoing embodiment, the roof rail garnish 19 is located, in the upper edges of side windows W1 and W2 inside the vehicle, from the front pillar FP to the upper part and rear edge of the rear pillar RP, via the roof side rail RR above the center pillar CP or a middle pillar. As shown in FIGS. 1 to 5 and 8, the garnish 19 is made from synthetic resin such as PC (polycarbonate)/ABS (Acrylonitrile butadiene styrene), polypropylene with filler, or thermo-plastic elastomer of polyolefin, and is formed into a single, slightly curved but flat plate having a vertically extending section. The garnish 19 includes a panel portion 20 extending in the front-rear direction, and is provided entirely along lower edge of the panel portion 20 with a door portion 22 that is pushed open by the airbag 41 upon deployment of the airbag 41. Along the upper edge of the door portion 22 is a thinned hinge line 21 for helping easy opening of the door portion 22.

The panel portion 20 may be provided with a skin in its surface 20a in the interior side. Although a front part of the garnish 19 serves as a front pillar garnish 4 for covering the inner side of the front pillar FP, the front pillar garnish may be formed separately from the roof rail garnish 19 so as to cover a front part of the folded airbag 41. When the front pillar garnish is formed separately from the roof rail garnish 19, a foremost mounting portion 44 and mounting bracket 46 of the airbag 41 are directly bolt fixed to an inner panel 2 as part of the vehicle body 1 in the front pillar FP.

The panel portion 20 is provided in its exterior side 20b or a back side with attaching portions 24, 26, a supporter 28 and mounting portions 30 protruded toward exterior O. Each of the attaching portions 24 is a portion to which each of the mounting portions 44 of the airbag 41 is attached, and includes an attaching seat 24a having a generally square columnar shape and protruded toward exterior O, and a bolt 24b embedded in the attaching seat 24a and protruded from the attaching seat 24a toward exterior O. Each of the attaching portions 26 is a portion to which each of the mounting brackets 49 clamping the inflator 48 is attached, and includes an attaching seat 26a having a generally square columnar shape and protruded toward exterior O, and a bolt 26b embedded in the attaching seat 26a and protruded from the attaching seat 26a toward exterior O. The supporter 28 has such a half round pipe shape as to support the lower part of the inflator 48, and protrudes in a curved shape from the back side 20b of the panel portion 20.

Figure 4:
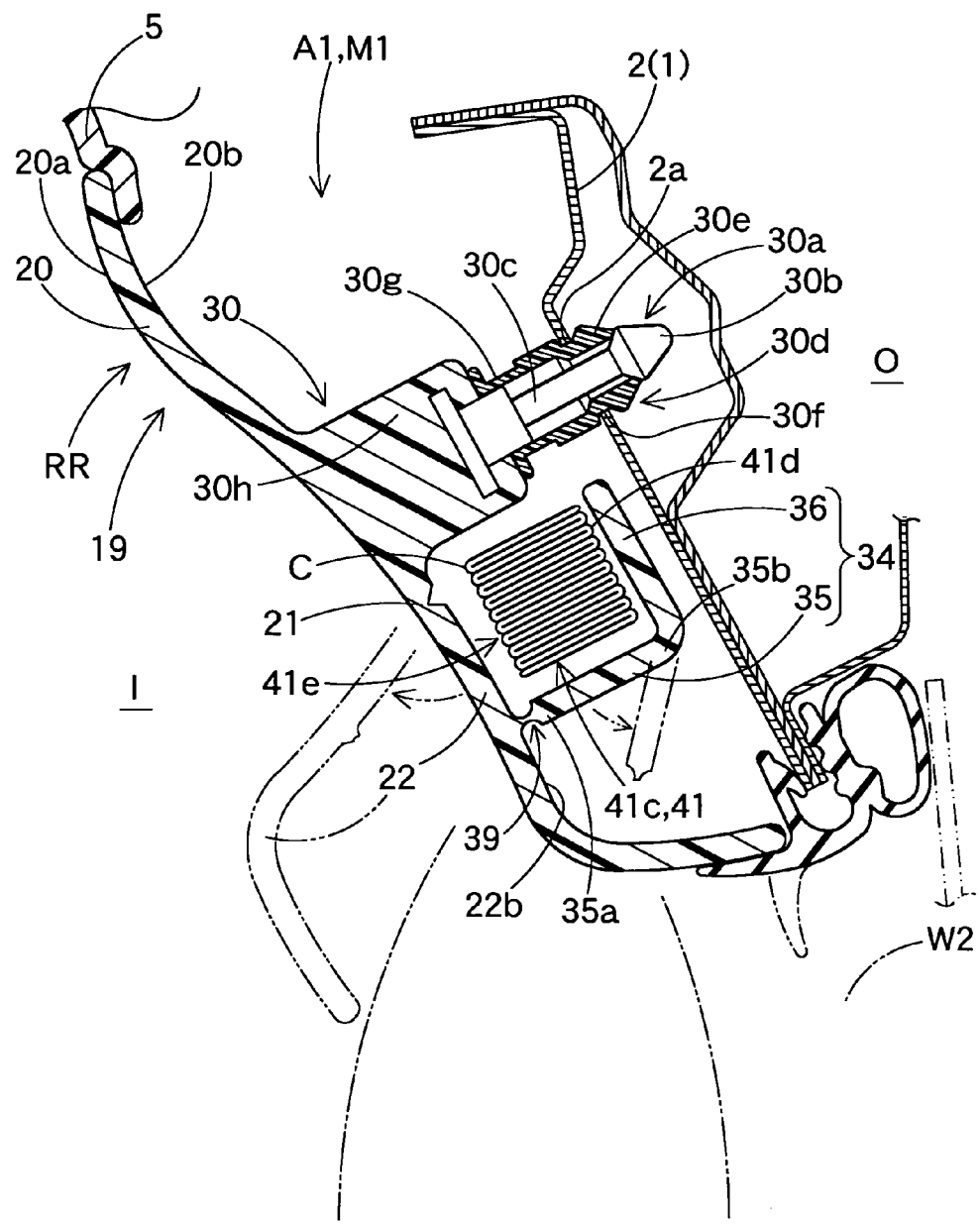
FIG. 4 is a vertical section showing the head-protecting airbag device of FIG. 1 in service, taken along line IV-IV in FIG. 1.
Figure 5:
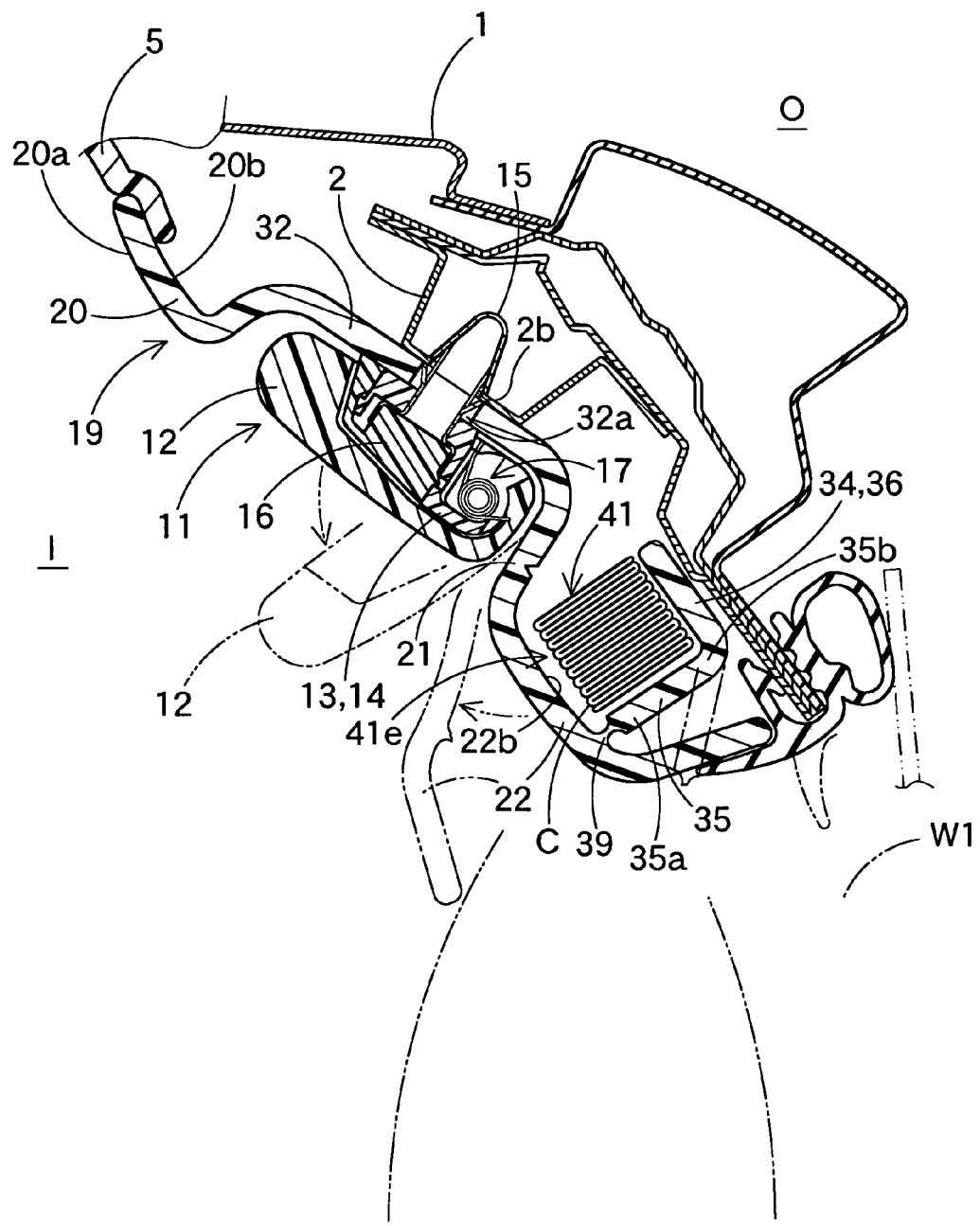
FIG. 5 is a vertical section showing the head-protecting airbag device of FIG. 1 in service, taken along line V-V in FIG. 1.
Figure 9A:
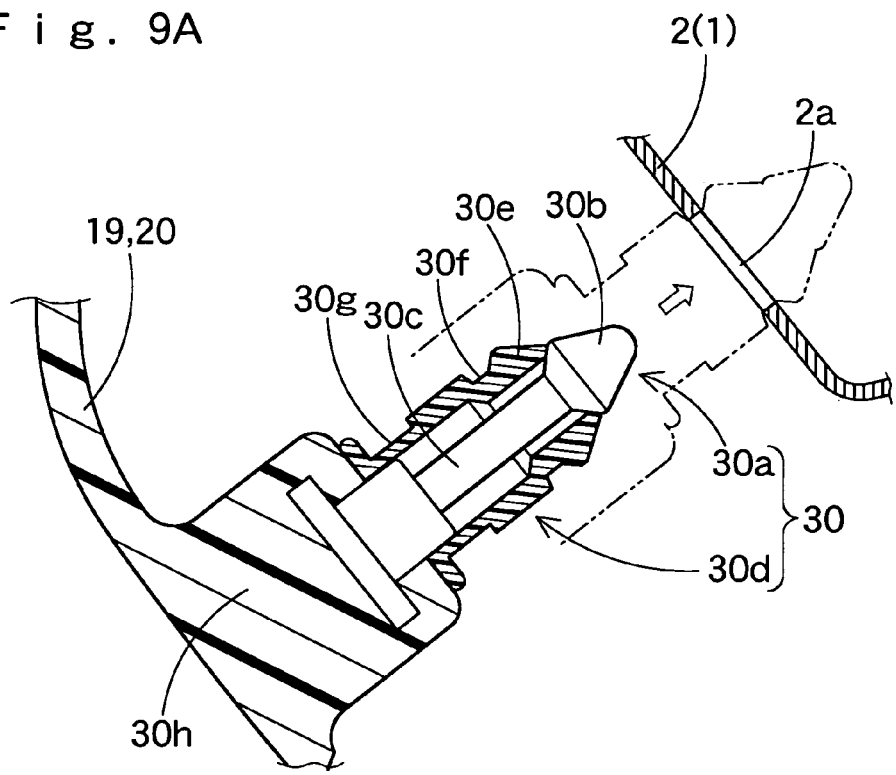
FIGS. 9A and 9B are sectional views showing an attaching manner of a roof rail garnish used in the airbag device of FIG. 1 to the vehicle body.
Figure 9B:
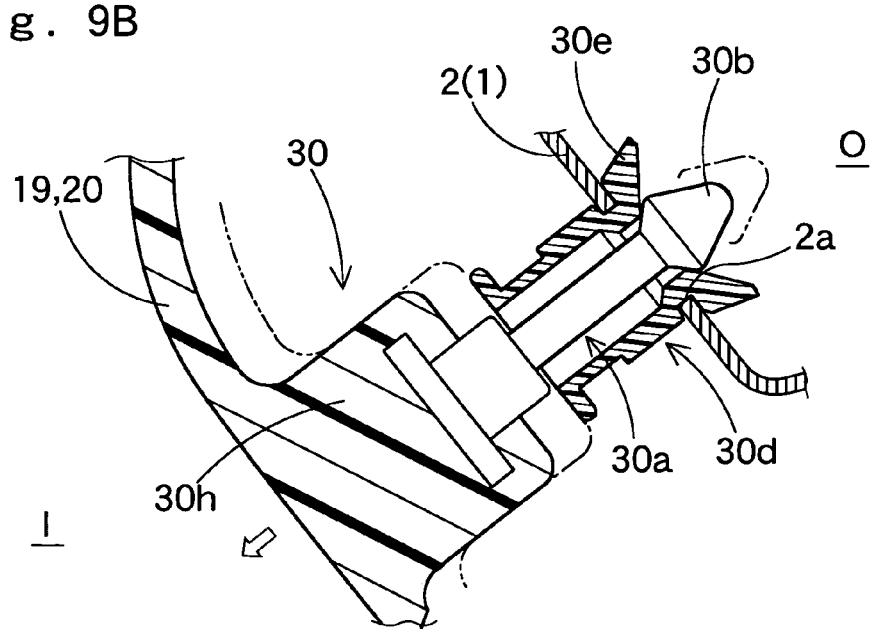

As shown in FIGS. 4 and 9, each of the mounting portions 30 serves as a portion to attach the roof rail garnish 19 to the vehicle body 1 of the vehicle V. The mounting portions 30 are located in six positions in the back side 20b of the panel portion 20, and each includes a metal axis 30a embedded in a mounting seat 30h of the panel portion 20 and protruded toward exterior O, and a cap 30d made from rubber or soft synthetic resin to cover the axis 30a. The axis 30a includes a neck portion 30c and a head 30b bulged in radius direction at the leading end of the neck portion 30c. The cap 30d has a substantially cylindrical shape capable of covering over the axis 30a, and is provided with a thick retaining portion 30e located at the leading end and retained by the head 30b, a retaining recess 30f located in the outer circumference near a root part of the retaining portion 30e, and a U-groove 30g located in the outer circumference near a root part of the cap 30d. The mounting portion 30 is secured to the inner panel 2 by being inserted into the mounting hole 2a of the inner panel 2 up to the position of the retaining recess 30f, with the axis 30a sheathed with the cap 30d, such that the cap retaining portion 30e held at the axis head 30b is retained by the exterior periphery of the mounting hole 2a. In this mounted state, even if the roof rail garnish 19 is pulled toward the interior I forcefully, only the garnish 19 shifts toward the interior I according to the plastic deformation of the cap retaining portion 30e, as shown in FIG. 9B, but the axis head 30b and the cap retaining portion 30e are not pulled out of the mounting hole 2a, so that the mounting portion 30 is securely attached to the inner panel 2.

In occasions of removing the mounting portion 30 from the inner panel 2 for maintenance and soon, the mounting portion 30 is firstly pushed in toward the exterior O until the U-groove 30g of the cap 30d is positioned in the inner circumference of the mounting hole 2a. Since the inner diameter of the cap 30d is predetermined such that the head 30b of the axis 30a may be pulled out of the cap 30d, the axis 30a can be then pulled out of the cap 30d and the mounting hole 2a while leaving the cap 30d retained in the periphery of the mounting hole 2a. Thus the garnish 19 can be detached from the inner panel 2.

The attaching portions 24, the supporter 28 and the mounting portions 30 are located in the vicinity of the vertical center of the panel portion 20. Immediately below the attaching portions 24, the supporter 28 and the mounting portions 30 is a hinge line 21 which the door portion 21 opens around when opened.

As shown in FIGS. 1, 5, 6 and 8, the panel portion 20 are provided at two positions with mounting seats 32 recessed toward the exterior O for locating assist grips for occupants in the front seat and rear seat therein. Each of the mounting seats 32 is recessed in an inverted-U shape as viewed from the interior I, and is provided with two rectangular through holes 32a.

Referring to FIGS. 1, 5, 6, and 10, the assist grips 11 are located in the interior I of the roof side rail RR in the upper edges of side windows W1 and W2, i.e., in the region where the roof rail garnish 19 is positioned. Each of the assist grips 11 includes an inversed-U shaped grip portion 12 for a vehicle occupant to hand-grip, and fixing portions 13 located in front and rear ends of the grip portion 12. Each of the fixing portions 13 includes a base 14 which is rotatably joined with the end of the grip portion 12 with a hinge mechanism 17 interposed therebetween, a retaining piece 15 and a cap 16. The hinge mechanism 17 is constructed such that its part located in one of the two fixing portions 13 of the assist grip 11 includes a damper mechanism, and the other part located in the other fixing portion 13 includes a spring member for helping the grip portion 12 to return after turning. The grip portion 12, when in service, is pulled out toward the interior I by being turned around the position of the hinge mechanism 17, as indicated by double-dotted lines in FIG. 5.

Figure 6:
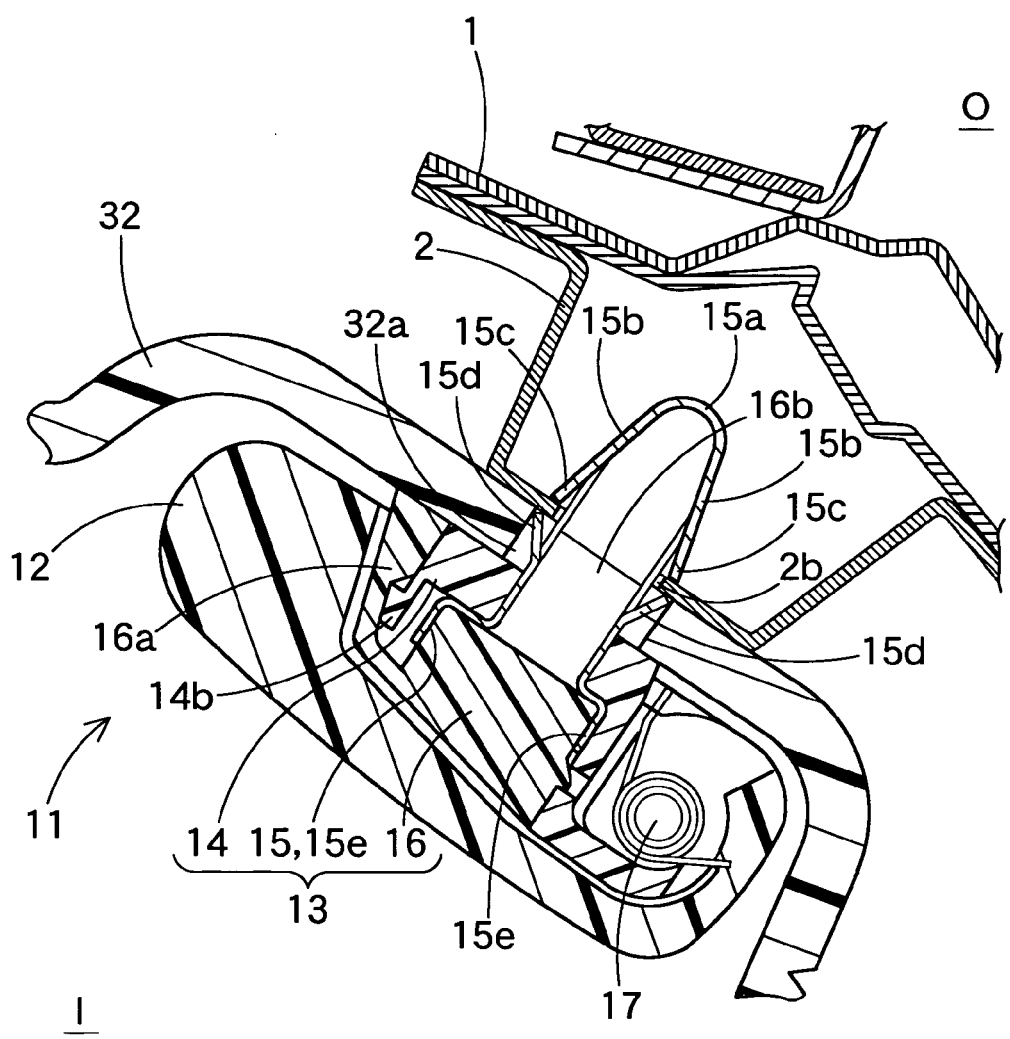
FIG. 6 is an enlargement of FIG. 5 showing the vicinity of an assist grip.
Figure 10:
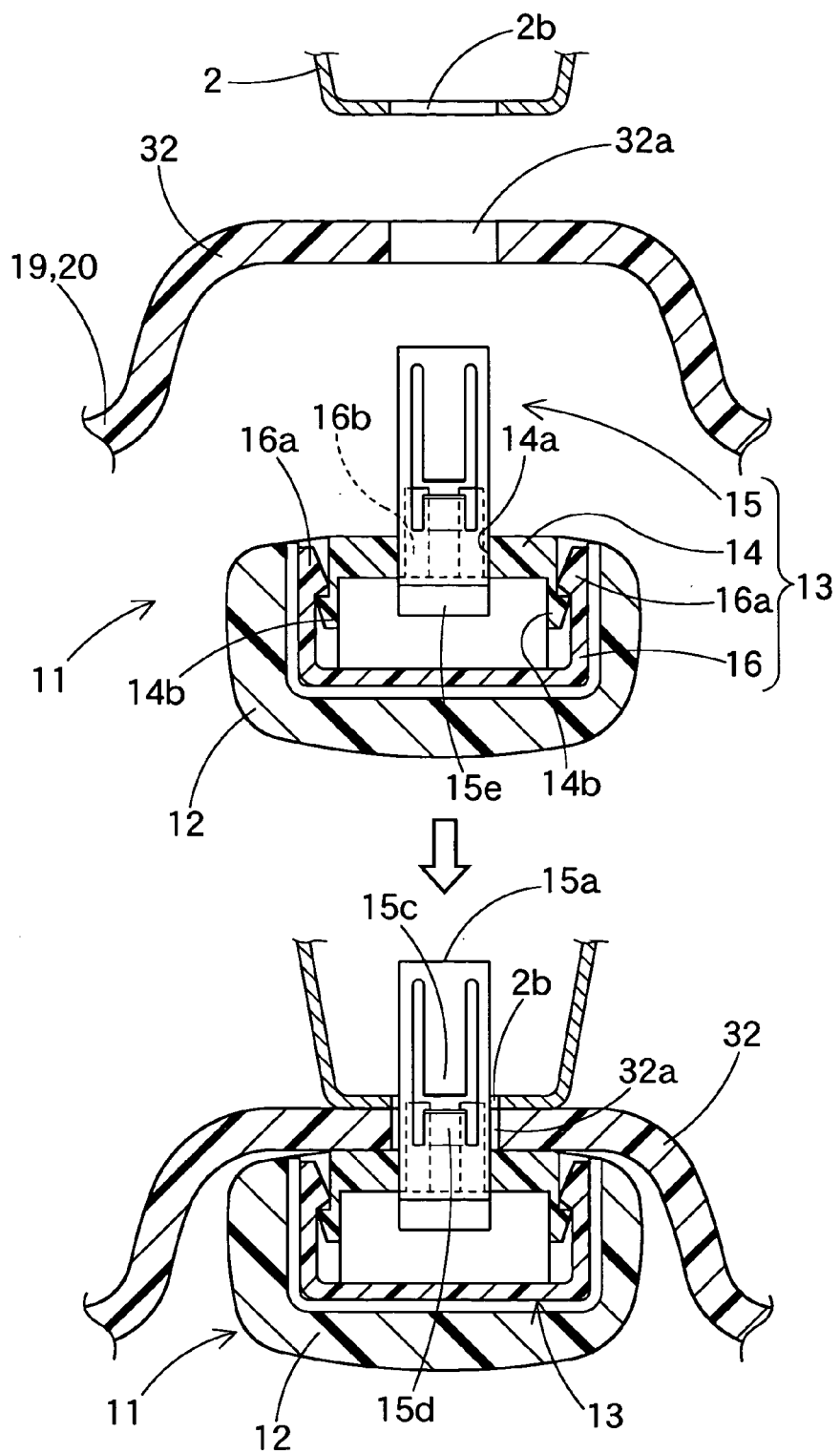
FIG. 10 is a sectional view showing an attaching manner of the assist grip of FIG. 6 to the vehicle body.

Referring to FIGS. 6 and 10, the base 14 is made from synthetic resin, and includes a hole 14a which opens in a rectangular shape through in the interior-exterior direction. The hinge mechanism 17 is located at the lower end of the base 14. The retaining piece 15 is put through the through hole 14a. In the interior I of the base 14a are plurality of retaining pawls 14b for retaining the cap 16.

The cap 16 made from synthetic resin is exposed in the vehicle's interior I when the grip portion 12 is turned and pulled out. The cap 16 includes an engaging portion 16a to be engaged with the retaining pawl 14b of the base 14, and two spacers 16b to be inserted in between side walls 15b of the retaining piece 15 upon engagement with the base 14. The spacers 16b are adapted to prevent the side walls 15b of the retaining piece 15 from approaching each other, and to stabilize the fixation of the retaining piece 15 to the inner panel 2.

The retaining piece 15 formed by bending a spring sheet metal has a substantially U-shaped section with its leading end 15a rounded, and is bifurcated from the leading end 15a into the side walls 15b. Each of the side walls 15b includes a retaining projection 15c which is formed by cutwork and raised to project outwardly, and a holding projection 15d which is also formed by cutwork to confront the interior end of the retaining projection 15c. When the retaining piece 15 is inserted into the mounting hole 2b of the inner panel 2 of the vehicle body 1, the retaining projection 15c is once deformed to pass through the mounting hole 2b, and then springs back such that the periphery of the mounting hole 2b is positioned between the retaining projection 15c and the holding projection 15d. Consequently, the retaining piece 15 is secured to the inner panel 2 tightly by being suppressed from moving toward the interior I or exterior O. Ends 15e of the retaining piece 15 located toward the interior I serve as a grip portion for gripping when pulling the retaining piece 15 out of the mounting hole 2b such that the side walls 15b approach each other to shift the retaining projections 15c into the mounting hole 2b from the periphery of the mounting hole 2b.

When the side walls 15b are made to approach each other to remove the retaining piece 15 from the inner panel 2, the spacers 16b of the cap 16 positioned between the side walls 15b are pulled out of the space between the side walls 15b by removing the cap 16. By then removing the retaining piece 15, the assist grip 11 can be detached, so that the garnish 19 can be detached from the inner panel 2.

As shown in FIGS. 1 to 5 and 8, the roof rail garnish 19 is provided in the exterior side O near the door portion 22 with a cover portion 34 integrally molded with the garnish 19. The cover portion 34 includes a bottom wall 35 and a side wall 36, and has a L-shaped section. The cover portion 34 is formed in the back side 20b of the generally entire length of the panel portion 20 for covering a lower side 41c and an exterior side 41d of the folded airbag 41 over its entire length. The bottom wall 35 is adapted to cover the lower side 41c of the airbag 41 from an exterior side 22b of the door portion 22 up to the exterior O of the folded airbag 41, while the side wall 36 extends upward from an exterior end 35b of the bottom wall 35 for covering the exterior side 41d of the folded airbag 41.

Figure 8:
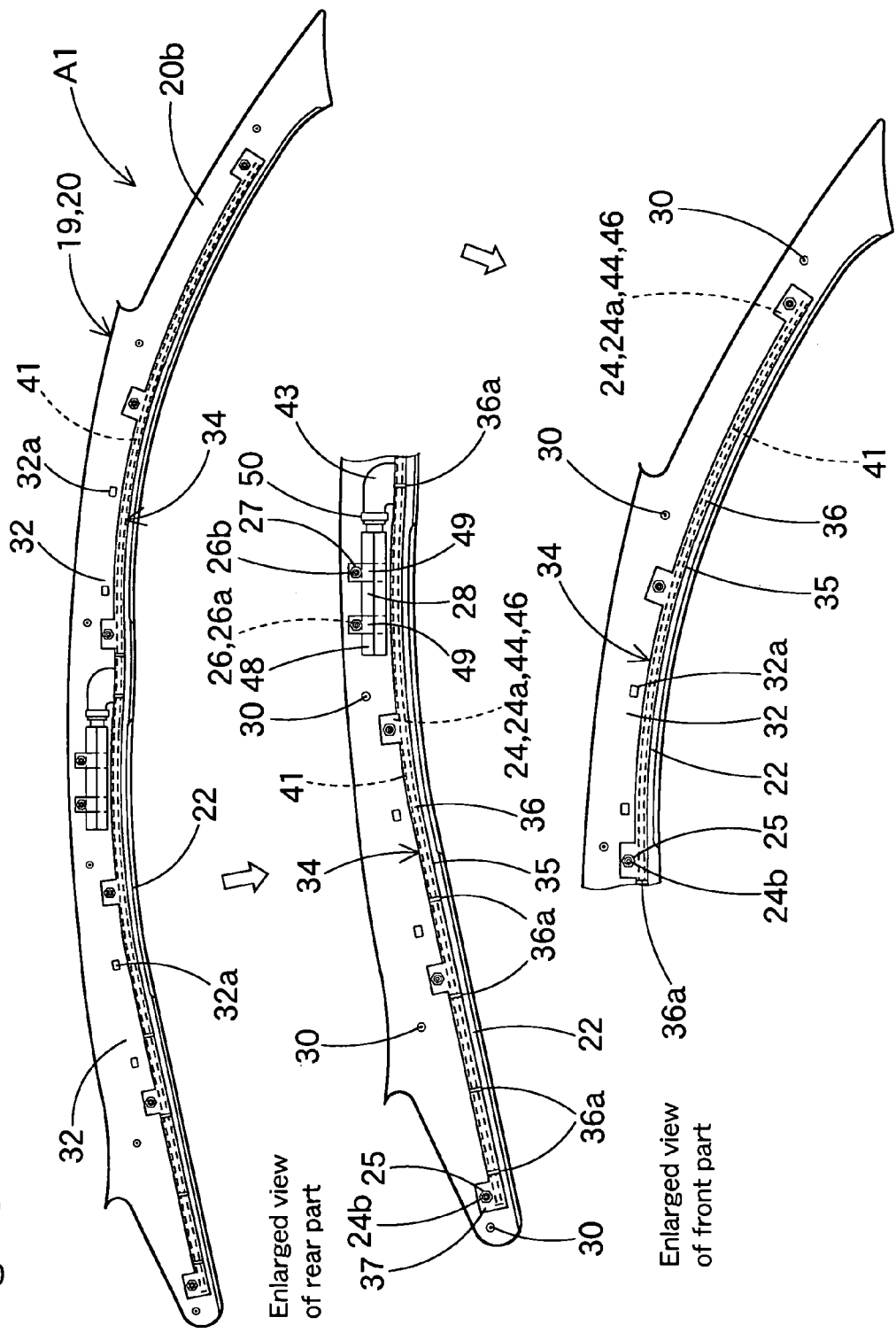
FIG. 8 are rear views of an airbag module in the airbag device of FIG. 1.

As best shown in FIGS. 2 and 8, the side wall 36 is provided with joint portions 37 protruded upward from the upper end of the side wall 36 to confront each of the attaching seats 24 of the garnish 19. Each of the joint portions 37 includes a joint hole 37a for inserting the embedded bolt 24b therethrough. Each of the joint portions 37 is fastened to the attaching portion 24 of the garnish 19 together with the mounting portion 44 of the airbag 41, by having the bolt 24b put through the holes 44a and 46c of the mounting portion 44 and the mounting bracket 46 inserted through the joint hole 37a and fastened with the nut 25.

Figure 3:
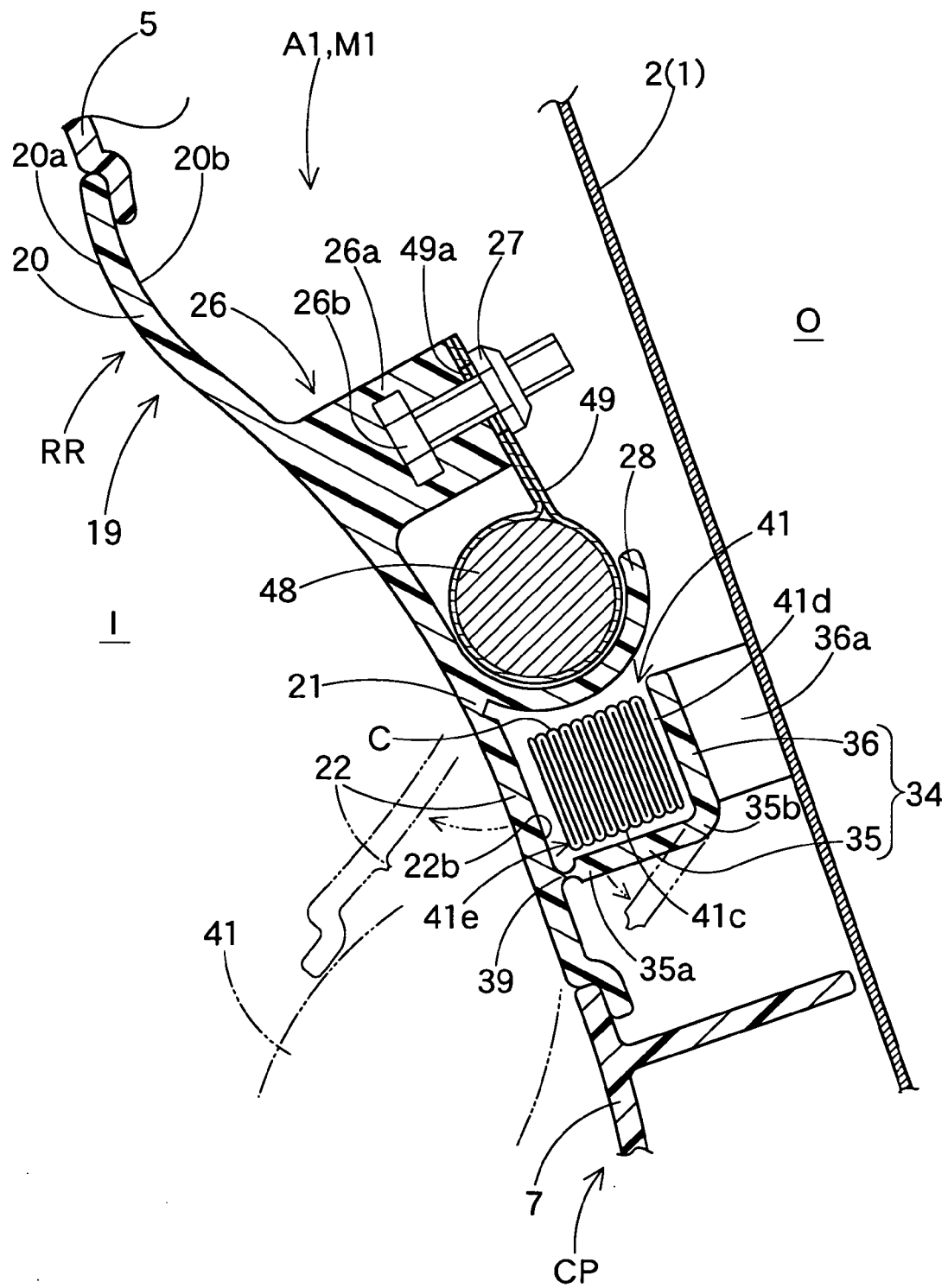
FIG. 3 is a vertical section showing the head-protecting airbag device of FIG. 1 in service, taken along line III-III in FIG. 1.

As shown in FIGS. 3 and 8, the side wall 36 is further provided at positions above the center pillar CP and the rear pillar RP in the exterior O side with a plurality of ribs 36a protruded toward exterior O. The ribs 36a abut against the inner panel 2 as part of the vehicle body 1 when the garnish 19 is mounted on the vehicle V. The airbag 41 is so twisted and housed above the pillars CP and RP as not to go into the exterior O of the garnishes 7 and 6 for the pillars CP and RP, but as to protrude inward and slightly downward than the horizontal direction in the initial stage of deployment of the airbag 41. The ribs 36a are adapted to support the side wall 36 securely in the initial stage of deployment of the airbag 41, so as not to deform the side wall 36.

As shown in FIGS. 2 to 5, the cover portion 34 is joined at its interior end 35a in the bottom wall 35 with the exterior side 22b of the door portion 22 of the garnish 19 by a thinned breakable portion 39.

To mount the head-protecting airbag device M1 on the vehicle, the garnish 19, the cover portion 34, the airbag 41, the mounting brackets 46 and 49, and the inflator 48 are assembled into an airbag module A1, firstly, as shown in FIG. 8. When the airbag module A1 is formed, the airbag 41 is folded up firstly. As shown in FIG. 7, the airbag 41 is bellows-folded, from flat expanded, and deflated state, on crest and valley folds C (as referred to FIGS. 2 to 5), so that its lower edge 41b is brought closer to the upper edge 41a. After folding up, an unillustrated breakable tape member is wound around the folded airbag 41 at predetermined intervals for keeping the folded-up configuration. In the meantime, the mounting brackets 46 are attached to the individual mounting portions 44, and the inflator 48 with the brackets 49 attached thereto is joined with the joint port 43 by the cramp 50. In positions above the pillars CP and RP, the airbag 41 is so twisted as to direct its lower edge 41b toward the interior I, and an unillustrated tape member is wound therearound to keep the twisted state.

Thereafter, the upper part of the side wall 36 of the cover portion 34 is opened toward the exterior O to locate the folded airbag 41 on the upper face of the bottom wall 35 of the cover portion 34, and the bolts 24b of the attaching portions 24 are inserted through the mounting holes 44a of the mounting portions 44 and the through holes 46c of the brackets 46. Then the side wall 36 is returned so that the bolts 24b are inserted into the joint holes 37a of the joint portions 37 located at the upper end of the side wall 36, and are fastened into the nuts 25. The inflator 48 is located on the supporter 28, and the bolts 26b of the attaching portions 26 are inserted into the mounting holes 49a of the brackets 49 to be fastened into nuts 27. Consequently, the airbag 41 and the inflator 48 are assembled with the garnish 19 having the cover portion 34 as its integral part, so as to form the airbag module A1.

To mount the airbag module A1 on the vehicle V, each of the mounting portions 30, in which the axis 30a is sheathed with the cap 30d, is inserted into the mounting hole 2a in the inner panel 2 up to the position of the retaining recess 30f such that the cap retaining portion 30e held at the axis head 30b is retained by the exterior periphery of the mounting hole 2a. Thus the airbag module A1 is mounted on the vehicle V.

Subsequently, the retaining pieces 15 of the fixing portions 13 in the assist grips 11 are inserted through the through holes 32a of the mounting seats 32, and then into the mounting holes 2b of the inner panel 2, and held thereat. By this time, the caps 16 and the retaining pieces 15 have been attached to the bases 14 of the fixing portions 13. Thus the fixing portions 13 hold the mounting seats 32 in the peripheries of the through holes 32a, and are secured to the inner panel 2. Thus the head-protecting airbag device M1 is mounted on the vehicle V.

In mounting the airbag module A1 on the vehicle, an unillustrated wire extending from an airbag control device for inputting actuating signals is connected to the inflator 48. Before the airbag device M1 is mounted on the vehicle, the roof head lining 5 is attached to the vehicle V. The center pillar garnish 7 and the rear pillar garnish 6 are attached to the vehicle body 1 after the airbag device M1 is mounted on the vehicle V.

When the inflator 48 is actuated after the airbag device M1 is mounted on the vehicle, inflation gas is discharged from the inflator 48, and flows into the gas admissive portion 42 of the airbag 41 via the joint port 43. The airbag 41 then inflates and breaks the tape member, pushes and opens the door portion 22 of the roof rail garnish 19, and deploys to cover the interior I of side windows W1 and W2 and pillars CP and RP, as indicated by double-dotted lines in FIGS. 2 to 5. Upon deployment of the airbag 41, the door portion 22 breaks the breakable portion 39 and opens toward the interior I around the hinge line 21, while the bottom wall 35 of the cover portion 34 opens slightly downward and directs its interior end 35a downward, as shown in FIGS. 2 to 5.

In the airbag module A1 of the head-protecting airbag device M1, the cover portion 34 formed over the entire length of the folded airbag 41 covers the lower side 41c of the airbag 41 from the exterior side 22b of the door portion 22 up to the exterior O of the folded airbag 41 by the bottom wall 35, and covers the side 41d in the exterior O of the airbag 41 by the side wall 36. Moreover, the cover portion 34 is joined to portions 24 of the garnish 19 away from and above the door portion 22 in the exterior O, above the folded airbag 41, by the joint portions 37 located above the side wall 36. These joint portions 24 and 37 prevent the airbag 41 from protruding upward than the side wall 36 of the cover portion 34, and also prevents the airbag 41 from being interfered with from outside.

In other words, three sides of the folded airbag 41, i.e., the interior side 41e, the lower side 41c, and the exterior side 41d are covered respectively by the vicinity of the door portion 22 of the roof rail garnish 19, the bottom wall 35 and the side wall 36 of the cover portion 34. Moreover, the airbag 41 is shielded from outside by the portions 24 and 37 joining the roof rail garnish 19 and the upper part of the side wall 36, and thus is prevented from popping out of the cover portion 34. Therefore, the airbag 41 is freed from being damaged during transportation.

Moreover, when the airbag 41 deploys after the airbag module A1 is mounted on the vehicle, the roof rail garnish 19 does not open its entire vertical width toward the interior I, but opens only the door portion 22 located along its lower edge. Accordingly, protruding amount of the airbag 41 toward the interior I is reduced.

In the head-protecting airbag device M1, therefore, the airbag 41 is protected until being mounted on the vehicle V, and the inward protruding amount of the roof rail garnish 19 is reduced when the device is in service.

In the first embodiment, each of the mounting portions 44 located along the upper edge 41a of the airbag 41 is secured to each of the attaching portions 24 of the garnish 19 together with the joint portion 37 of the cover portion 34, and thus the airbag module A1 is formed. With this construction, the attachment of the mounting portions 44 of the airbag 41 to the roof rail garnish 19 are done together when the joint portions 37 located above the side wall 36 of the cover portion 34 are attached to the garnish 19, and therefore, number of parts of the airbag module A11, its working processes and cost are reduced compared with a case of mounting those members separately.

Furthermore, the folded airbag 41 is joined only to the roof rail garnish 19 by having its mounting portions 44 joined to the garnish 19 together with the upper part 37 of the side wall 36 of the cover portion 34. This construction is able to omit a work of attaching the airbag 41 directly to the vehicle body 1.

The cover portion 34 is so joined at its interior end 35a in the bottom wall 35 with the exterior side 22b of the door portion 22 of the garnish 19 by a thinned breakable portion 39 as to be separable upon deployment of the airbag 41. On the other hand, the upper part 37 of the side wall 36 is so secured to the roof rail garnish 19 by bolts 24b and nuts 25 as to be unseparable upon deployment of the airbag 41.

With this construction, the bottom wall 35 of the cover portion 34 is joined to the door portion 22 of the garnish 19 except upon deployment of the airbag 41, and therefore, it is prevented that foreign bodies intrude from a joint portion 39 of the bottom wall 35 and the door portion 22. Of course, the cover portion 34 does not fly into the interior I, since the cover portion 34 is not separated from the garnish 19 upon deployment of the airbag 41 because of the joinder of the joint portions 37 of the side wall 36 to the attaching portions 24.

Especially in the first embodiment, the cover portion 34 is integrally molded with the roof rail garnish 19, and the interior end 35a of the bottom wall 35 and the door portion 22 are joined with each other by the thinned breakable portion 39. Since the cover portion 34 and the garnish 19 are already connected when the airbag module A1 is assembled, the cover portion 34 can be assembled into the airbag module A1 only by an attaching work of the upper part 37 of the side wall 36 to the garnish 19, so that assembling work of the airbag module A1 is facilitated.

In the first embodiment, the individual mounting portions 44 of the airbag 41 are attached only to the roof rail garnish 19 and are not directly fixed to the vehicle body 1. However, as a second embodiment of the head-protecting airbag device M2 shown in FIGS. 11 to 14, it will also be appreciated that mounting portions 44 formed along the upper edge 41a of the airbag 41 are attached to a roof rail garnish 19A temporarily, and then secured to the vehicle body 1 together with the garnish 19A when an airbag module A2 is mounted on the vehicle V.

In the second embodiment, as shown in FIG. 12, each of the mounting portions 44 of the airbag 41 is fixed to the garnish 19A temporarily, and then secured to the vehicle body 1 utilizing mounting portions 30A having a similar construction to the mounting portions 30 in the first embodiment. More specifically, each of the mounting portions 30A has a longer neck portion 30c of the axis 30a, and has a longer retaining recess 30f of the cap 30d. The mounting portions 44 and the mounting brackets 46 are held in the retaining recess 30f of the cap 30d by the mounting holes 44a and the through holes 46c. Then the individual mounting portions 30A are inserted into retaining holes 2a and attached to the inner panel 2 of the vehicle body 1, so that each of the mounting portions 44 with the mounting bracket 46 is attached to the inner panel 2.

Figure 12A:
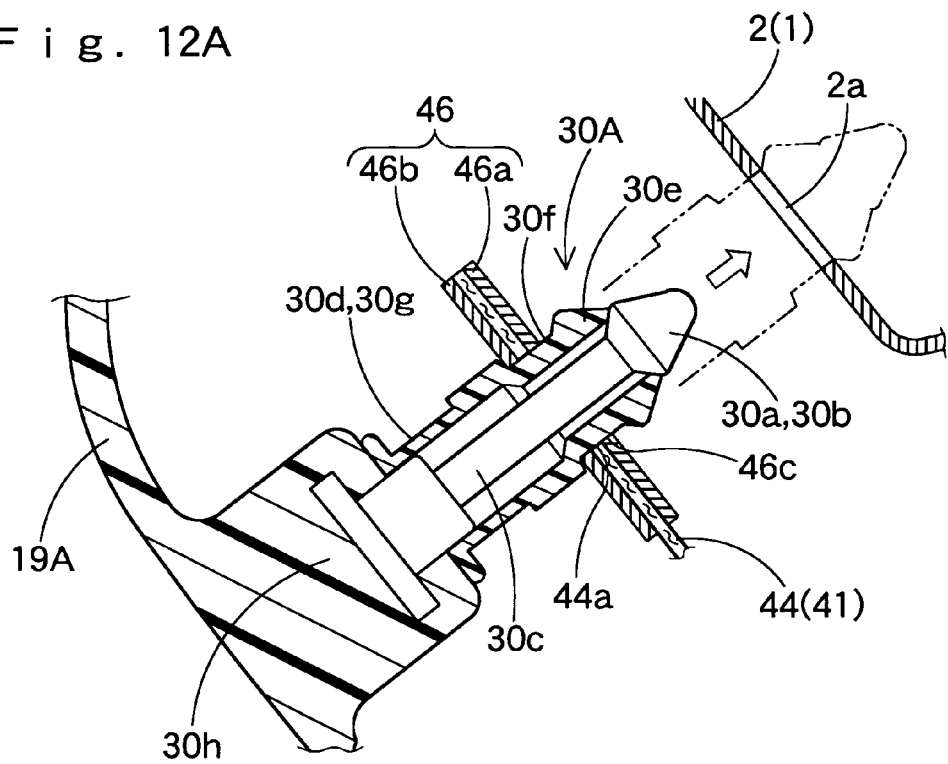
FIGS. 12A and 12B are sectional views showing an airbag and a roof rail garnish used in the airbag device of FIG. 11 secured together to the vehicle body.
Figure 12B:
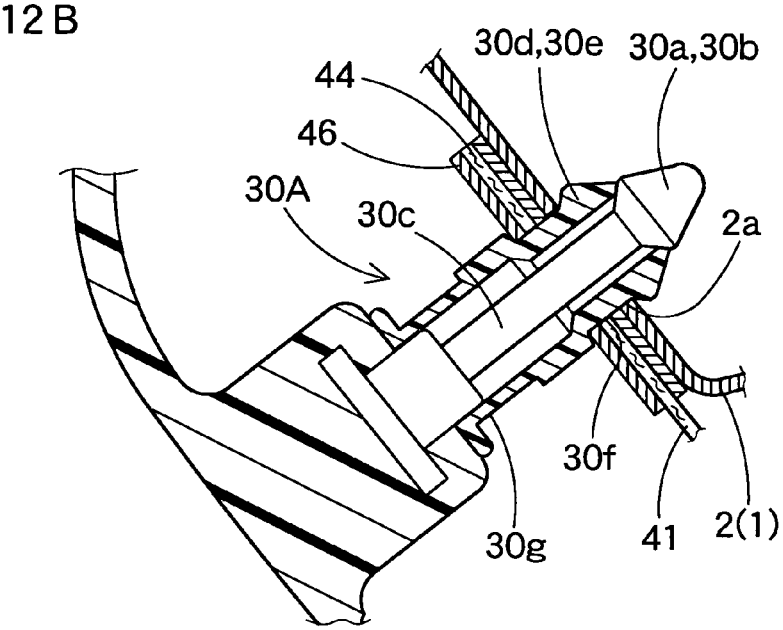

With this construction, the individual mounting portions 44 are retained in the retaining recesses 30f of the caps 30d, i.e., held temporarily by the roof rail garnish 19, as shown in FIG. 12A, and then are secured to the vehicle body 1 together with the garnish 19 when the airbag module A2 is mounted on the vehicle V, as shown in FIG. 12B. Since separate fixing means are not needed for the mounting portions 44 and the garnish 19, number of fixing parts, processes and cost for the fixing work are reduced, so that the airbag 41 is directly attached to the vehicle body easily, and stably.

Figure 14:
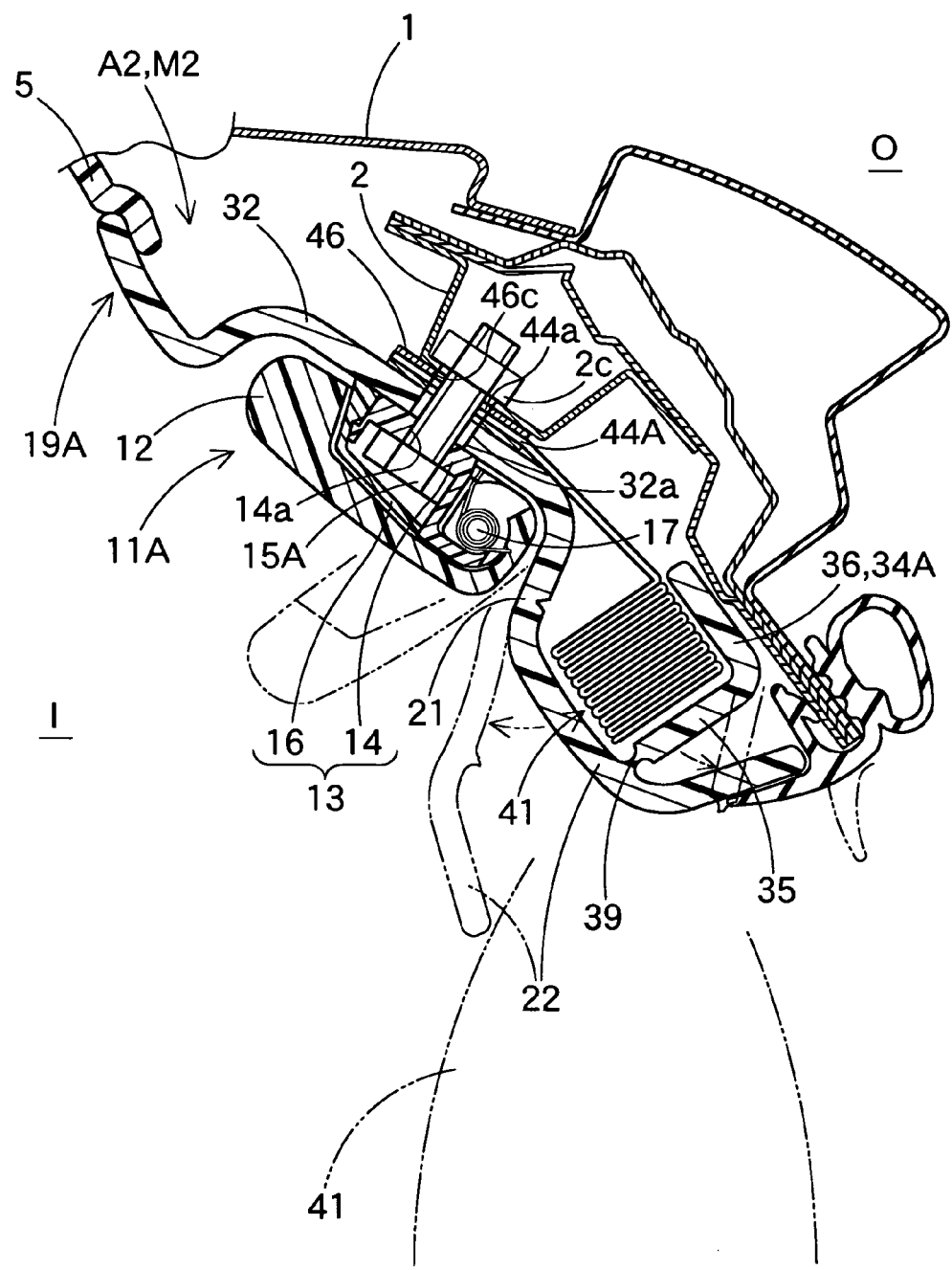
FIG. 14 is a sectional view showing an attaching manner of other portion of the airbag in FIG. 12 to the vehicle body.

In the airbag module A2 in the second embodiment, mounting portions 44A which are not handled with the mounting portions 30A are attached to the inner panel 2 of the vehicle body 1 utilizing fixing portions 13 of assist grips 11A, as shown in FIG. 14. Each of the assist grips 11A is secured at the fixing portions 13 to the inner panel 2 by bolts 15A to be fastened into male screw portions 2c of the inner panel 2, instead of the retaining pieces 15 of the assist grip 11 in the first embodiment. Each of the bolts 15A is put through the through hole 14a of the base 14, the through hole 32a of the mounting seat 32, and holes 44a and 46c of the mounting portion 44A on which the mounting bracket 46 is applied, and then fastened into the male screw portion 2c, so that the assist grip 11A and the mounting seat 32 are secured to the inner panel 2, while the mounting portions 44A of the airbag 41 are also secured to the inner panel 2 directly.

Figure 13:
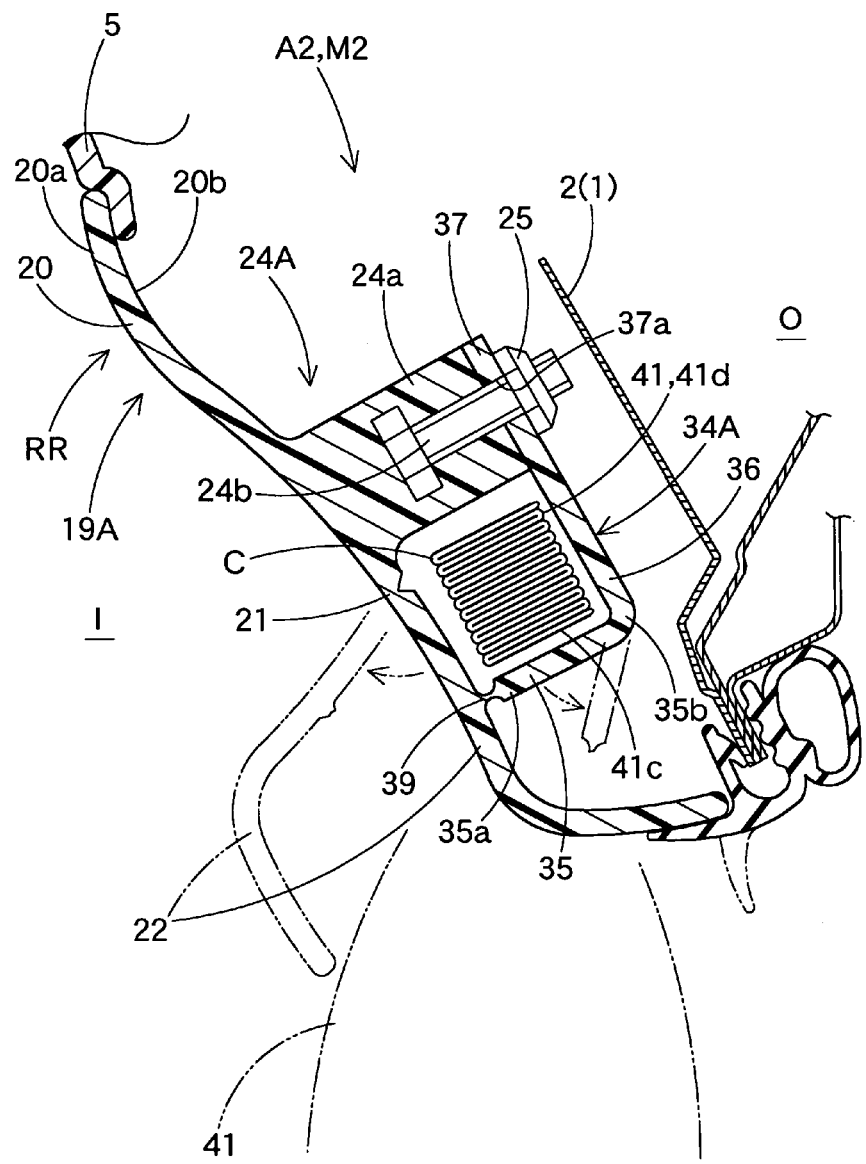
FIG. 13 is a sectional view showing a joinder of a cover portion and a roof rail garnish in an airbag module of the airbag device of FIG. 11.

In the airbag module A2 of the second embodiment, moreover, as shown in FIGS. 11 and 13, the upper part (joint portion) 37 of the side wall 36 of the cover portion 34A is joined to an attaching portion 24A by a bolt 24b and a nut 25, without involving the mounting portion 44 of the airbag 41 or the bracket 46.

The airbag module A2 has a similar construction to the airbag module A1 in the first embodiment, except in the mounting portion 30A of the roof rail garnish 19 and in that the mounting portions 44 and 44A are secured to the inner panel 2 by the mounting portions 30A and bolts 15A in the fixing portions 13 of the assist grips 11A, and further in that the attaching portions 24A and the joint portions 37 of the cover portion 34 are joined with each other not interposing the mounting portions 44. Therefore, common members and portions are designated by common reference numerals.

When the mounting portions 44A of the airbag 41 are secured to the inner panel 2 by the fixing portions 13 (or bolts 15A) of the assist grip 11A in the mounting work of the airbag module A2 on the vehicle V, if it is difficult to locate the mounting portions 44A of the airbag 41 to the male screw portions 2c and the through holes 32a, each of the mounting brackets 46 applied to the mounting portion 44A may be provided with a hook to facilitate positioning of the mounting portion 44A, which is to be retained in a hole formed in the inner panel 2 near the male screw portion 2c. Alternatively, the mounting seat 32 may be provided with a retaining piece for retaining the mounting bracket 46 to make the holes 44*a*, 46*c* and the through hole 32*a* consistent with one another.

Figure 15:
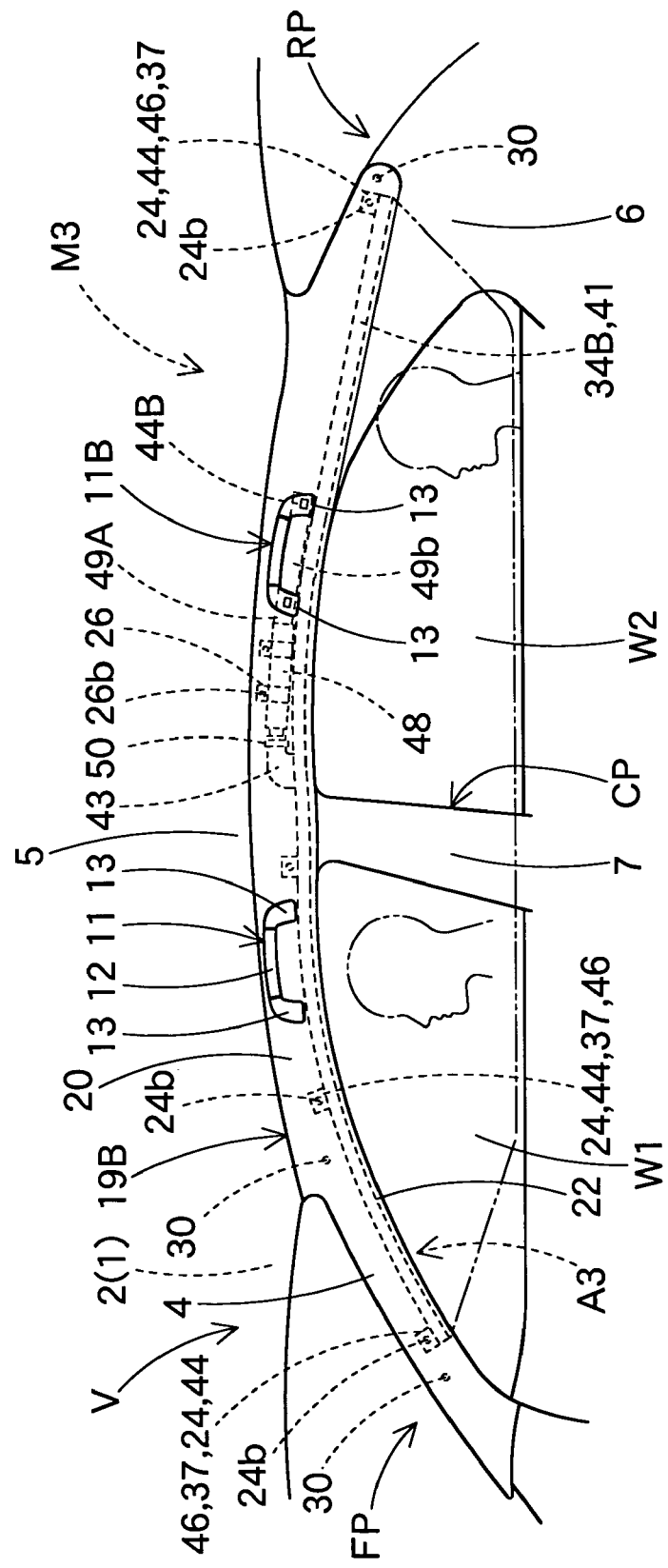
FIG. 15 is a front view of a third embodiment of the head-protecting airbag device according to the present invention in service, as viewed from the vehicle's interior.
Figure 16:
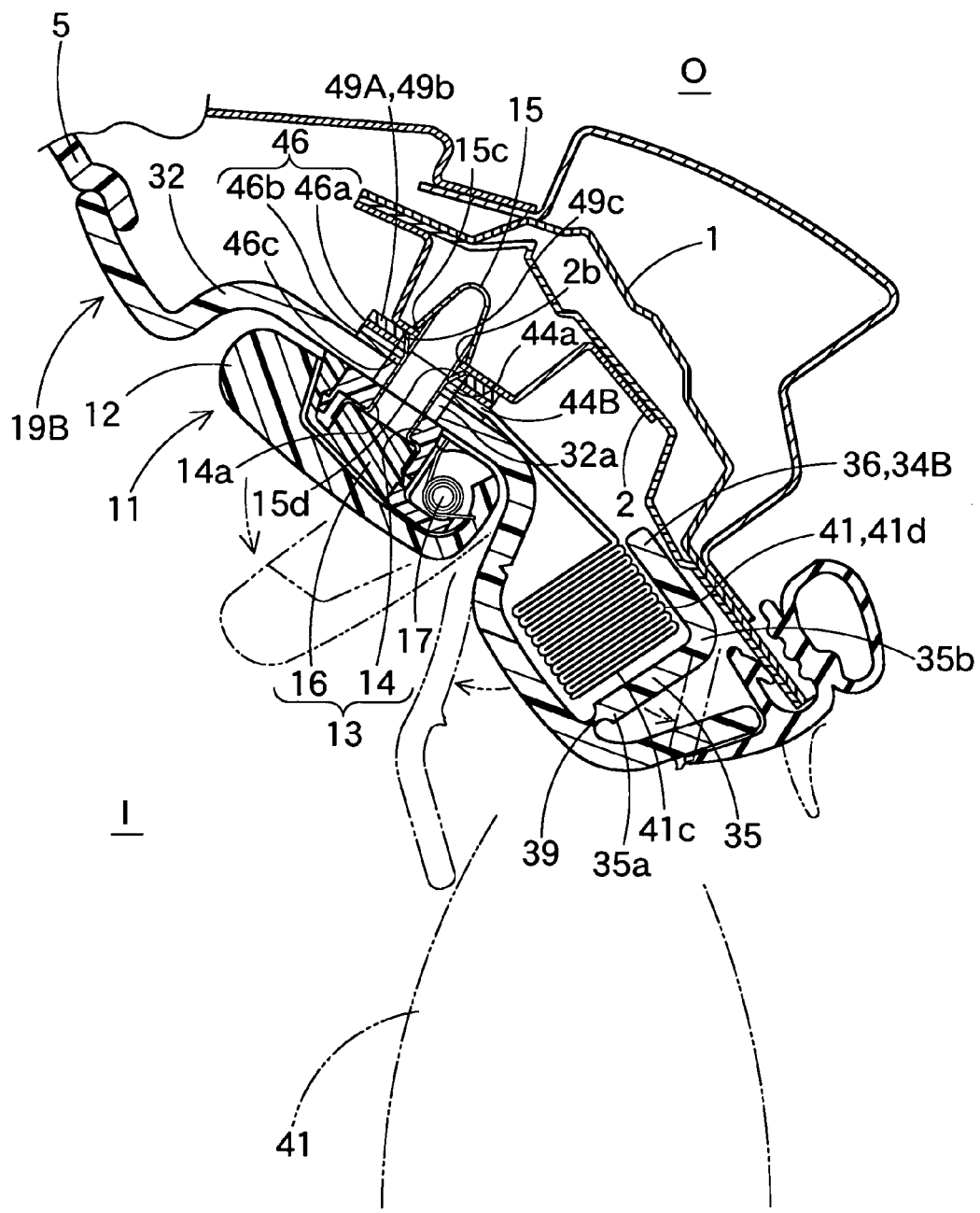
FIG. 16 is a sectional view showing an attaching manner of a bracket holding an inflator used in the airbag device of FIG. 15 to the vehicle body.

In the first embodiment, the inflator 48 is indirectly fixed to the vehicle body 1 through the roof rail garnish 19 by firstly attaching the inflator 48 to the attaching portions 26 and then mounting the mounting portions 30 of the garnish 19 on the inner panel 2. However, the brackets 49A holding the inflator 48 may be directly secured to the inner panel 2 as part of the vehicle body 1 to stably support the inflator 48, as in a third embodiment of the head-protecting airbag device M3 shown in FIGS. 15 and 16.

An airbag module A3 of the head-protecting airbag device M3 includes a mounting bracket 49A for holding the inflator 48 that is made of a single sheet metal, and has a portion 49*b* extending up to the location of an assist grip 11B. The extended portion 49*b* is provided with through holes 49*c* for inserting retaining pieces 15 of the fixing portions 13 therethrough. Each of the retaining pieces 15 of the assist grip 11B is put through through hole 14*a* of the base 14 in the fixing portion 13, through hole 32*a* in the mounting seat 32 in the roof rail garnish 19, holes 44*a* and 46*c* of the airbag 41 on which the bracket 46 is applied, the through hole 49*c* in the extended portion 49*b*, and the mounting hole 2*b* of the inner panel 2, and then is retained in an edge of the mounting hole 2*b* by its projections 15*c* and 15*d*.

In other words, in the assist grip 11B, the fixing portion 13 attaches the mounting portions 44B of the airbag 41 directly to the inner panel 2 as part of the vehicle body 1, together with the mounting bracket 49A holding the inflator 48, by the retaining piece 15.

The airbag module A3 has a similar construction to the airbag module A1 in the first embodiment, except in that the inflator 48 is directly secured to the vehicle body 1 by the bracket 49A, in that the mounting portions 44B are secured to the inner panel 2 by the retaining pieces 15 in the fixing portions 13 of the assist grips 11B, and further in that attaching portions 24 and joint portions 37 of a cover portion 34B are not formed in locations of the mounting portions 44B. Therefore, common members and portions are designated by common reference numerals.

In the airbag module A3, the mounting bracket 49A is also attached to the attaching portions 26 of the garnish 19B. Accordingly, the airbag module A3 can be mounted on the vehicle V in a condition that the inflator 48 is retained by the garnish 19B temporarily, and then the inflator 48 is directly and stably secured to the vehicle body 1. This simplifies a mounting structure of the mounting bracket 49A to the attaching portion 26.

Figure 17:
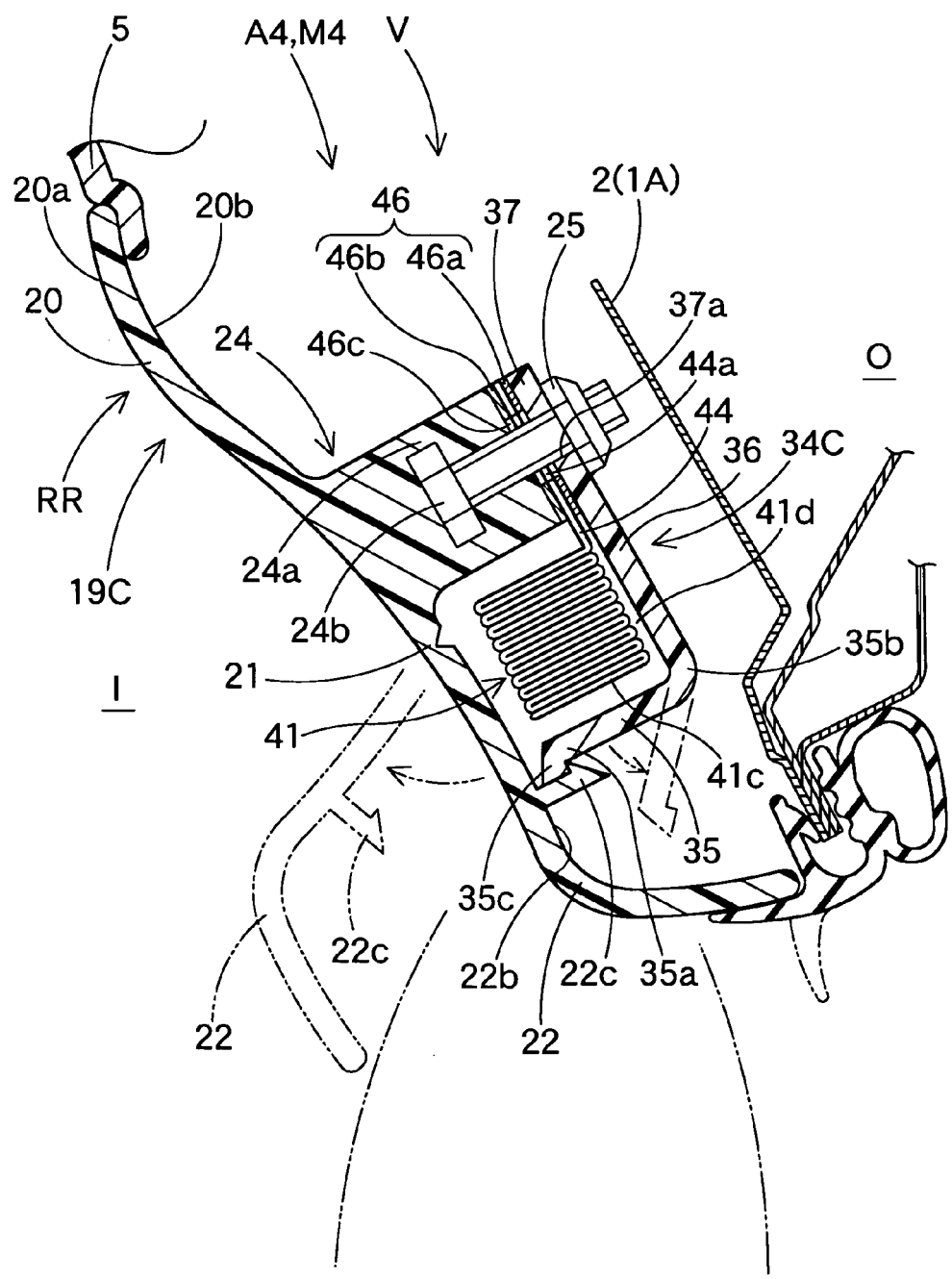
FIG. 17 is a partial vertical section of a fourth embodiment of the head-protecting airbag device of the present invention in service, and particularly shows an attaching position of an airbag.

In the first embodiment, the roof rail garnish 19 and the cover portion 34 are integrally molded. However, the garnish and the cover portion may be prepared separately as in a fourth embodiment of the head-protecting airbag device M4 shown in FIGS. 17 to 19.

An airbag module A4 in the fourth embodiment includes a cover portion 34C and a roof rail garnish 19C. The cover portion 34C is provided in the interior end 35*a* of the bottom wall 35 with a hook-like engaging portion 35*c* projected downward, while the garnish 19C is provided in the back side 22*b* of the door portion 22 with a hook-like engaging portion 22*c* to be engaged with the engaging portion 35*c*. The door portion 22 and the bottom wall 35 are joined to each other by the engagement of the engaging portions 22*c* and 35*c*. The engagement of the engaging portions 22*c* and 35*c* is so predetermined as to be canceled upon deployment of the airbag 41.

The airbag module A4 in the fourth embodiment has a similar construction to the airbag module A1 in the first embodiment, except in that the door portion 22 of the garnish 19C and the bottom wall 35 of the cover portion 34C are joined to each other by the engaging portions 22*c* and 35*c*, and therefore, common members and portions are designated by common reference numerals. Moreover, although the airbag module A4 differs from the first embodiment in a process of firstly joining the joint portions 37 of the cover portion 34C to the attaching portions 24, and then engaging the portions 22*c* and 35*c* with each other, other processes of assembling the module A4, and of mounting the module A4 on the vehicle V are the same as in the first embodiment.

Since the cover portion 34C is separable from the garnish 19C in the airbag module A4 in the fourth embodiment, the cover portion 34C is replaceable. Specifically, when the airbag module A4 is applied to a vehicle which has the same interior design in the roof rail garnish 19C but whose inner panel 2 in the vehicle body 1A differs from the inner panel 2 in the first embodiment in shape, the cover portion 34C can be replaced by a cover portion 34C that includes ribs 36*c* fittable to the vehicle body 1A with a different shape. If the cover portion 34C is thus replaced, the ribs 36*a* projected from the side wall 36 above the pillar CP fittedly abuts against the inner panel 2 of the vehicle body 1A, so that the twisted airbag 41 is able to protrude in generally horizontal direction in the interior I in the initial stage of inflation of the airbag 41, and then deploy smoothly without intruding in the exterior O of the pillar garnish 7.

Figure 18:
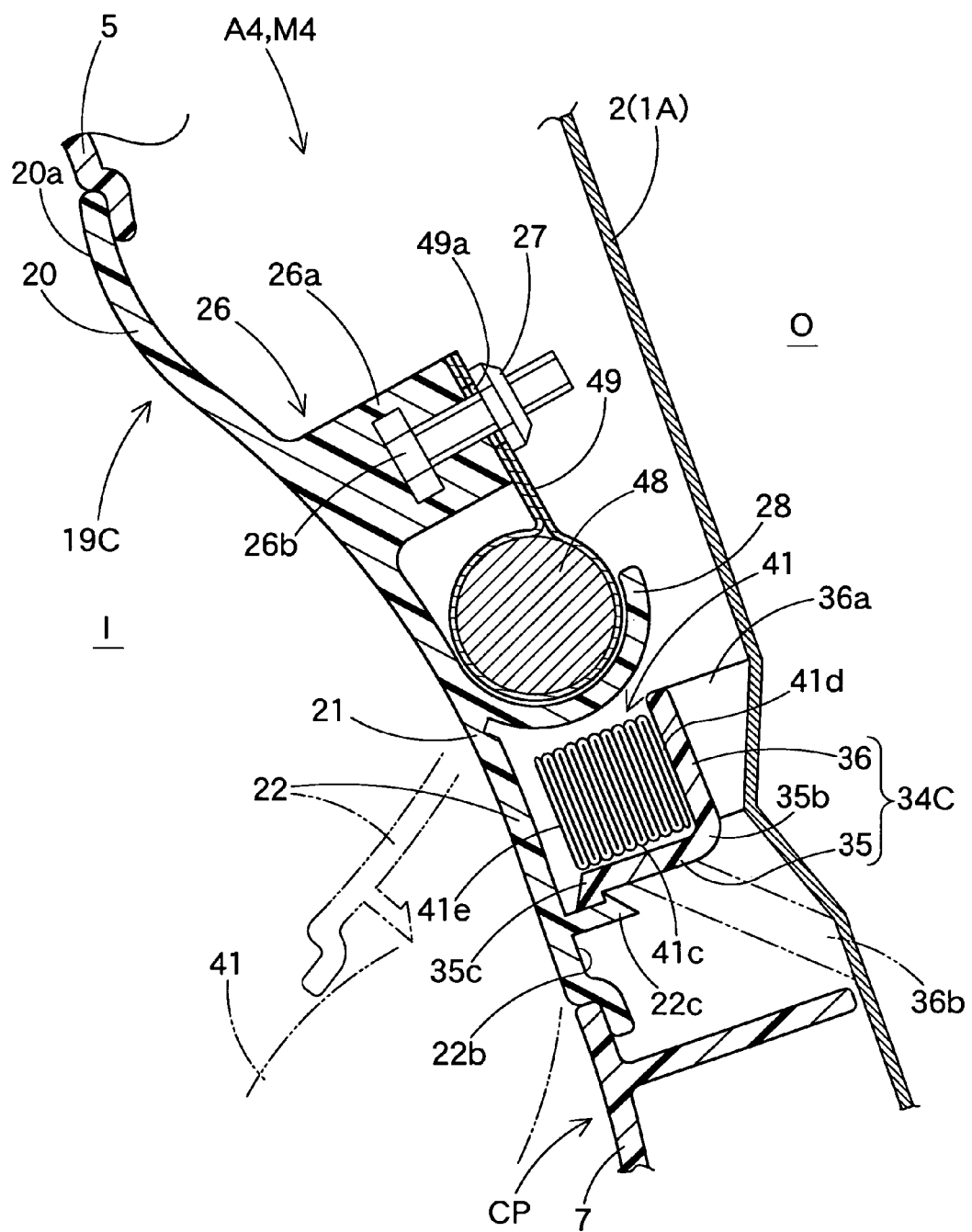
FIG. 18 is a partial vertical section of the airbag device of FIG. 17, particularly showing an attaching position of an inflator.
Figure 19:
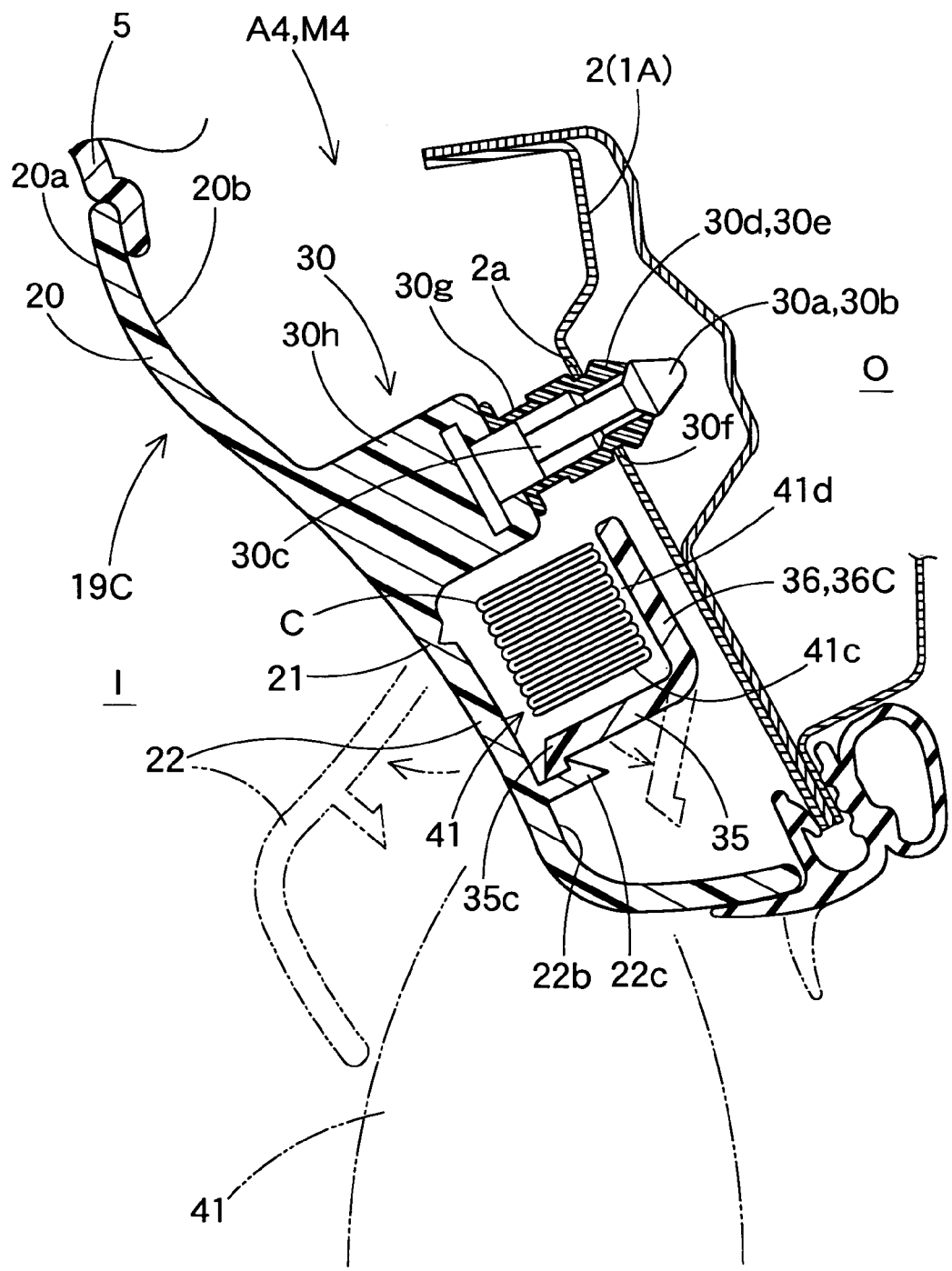
FIG. 19 is a partial vertical section of the airbag device of FIG. 17, particularly showing an attaching position of a roof rail garnish to vehicle body.

Although the foregoing embodiments show the ribs 36*a* formed on the side wall 36 of the cover portion 34C, the ribs may be so formed in the bottom wall 35 as to abut against the inner panel 2 upon deployment or from before deployment of the airbag 41, as ribs 36*b* indicated by double-dotted lines in FIG. 18.

In the airbag module A4 in the fourth embodiment, the cover portion 34C is separate from the garnish 19C, and the interior end 35*a* of the bottom wall 35 and the door portion 22 are separably joined to each other by the engaging portions 35*c* and 22*c*.

With this construction, the bottom wall 35 of the cover portion 34C is joined with the door portion 22 of the roof rail garnish 19C by the engagement of the engaging portions 35*c* and 22*c* except upon deployment of the airbag 41, which prevents foreign bodies from intruding from joined portions 22*c* and 35*c*.

Figure 20:
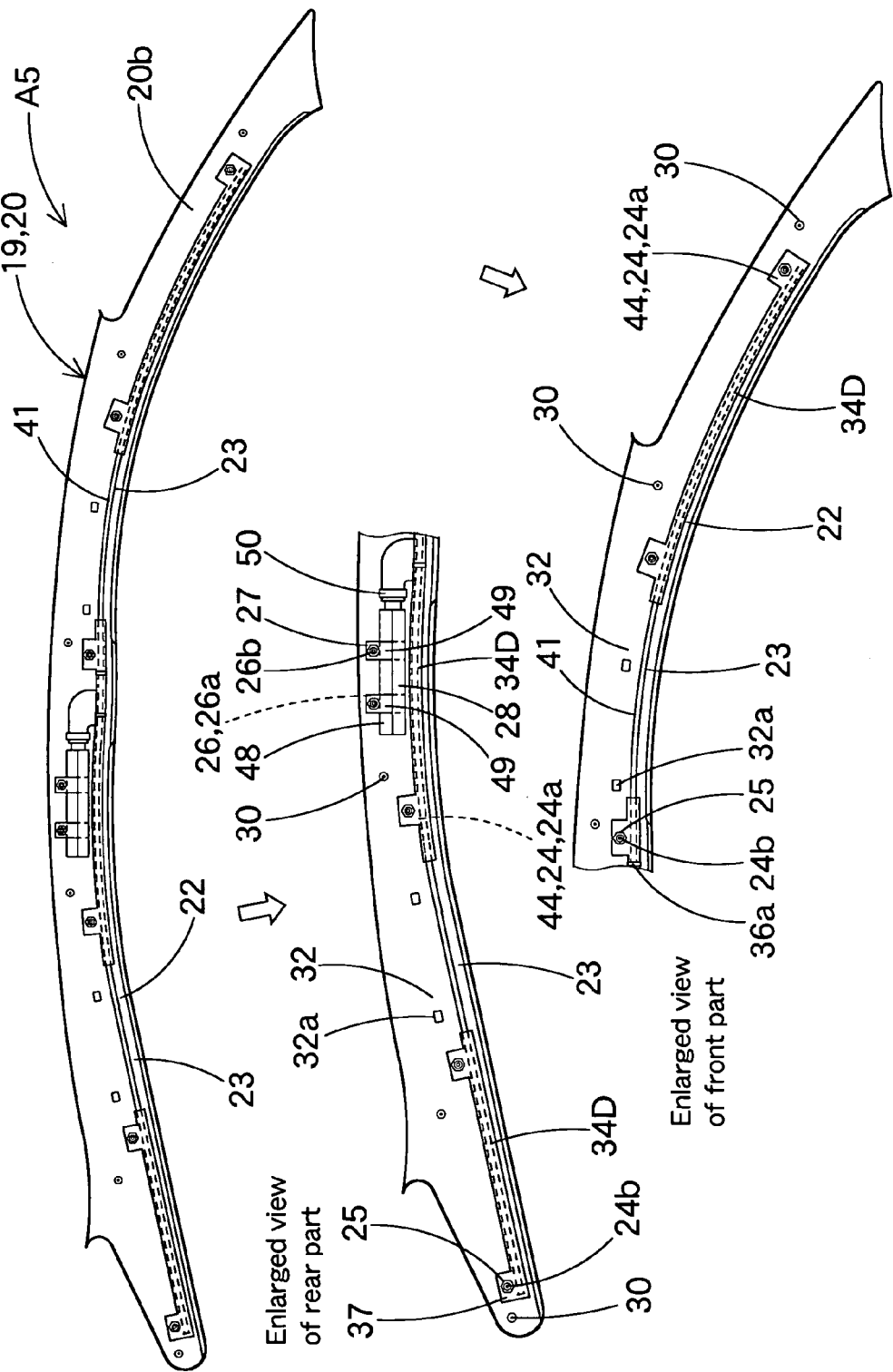
FIG. 20 is a rear view of an airbag module in a fifth embodiment of the head-protecting airbag device according to the present invention.
Figure 21:
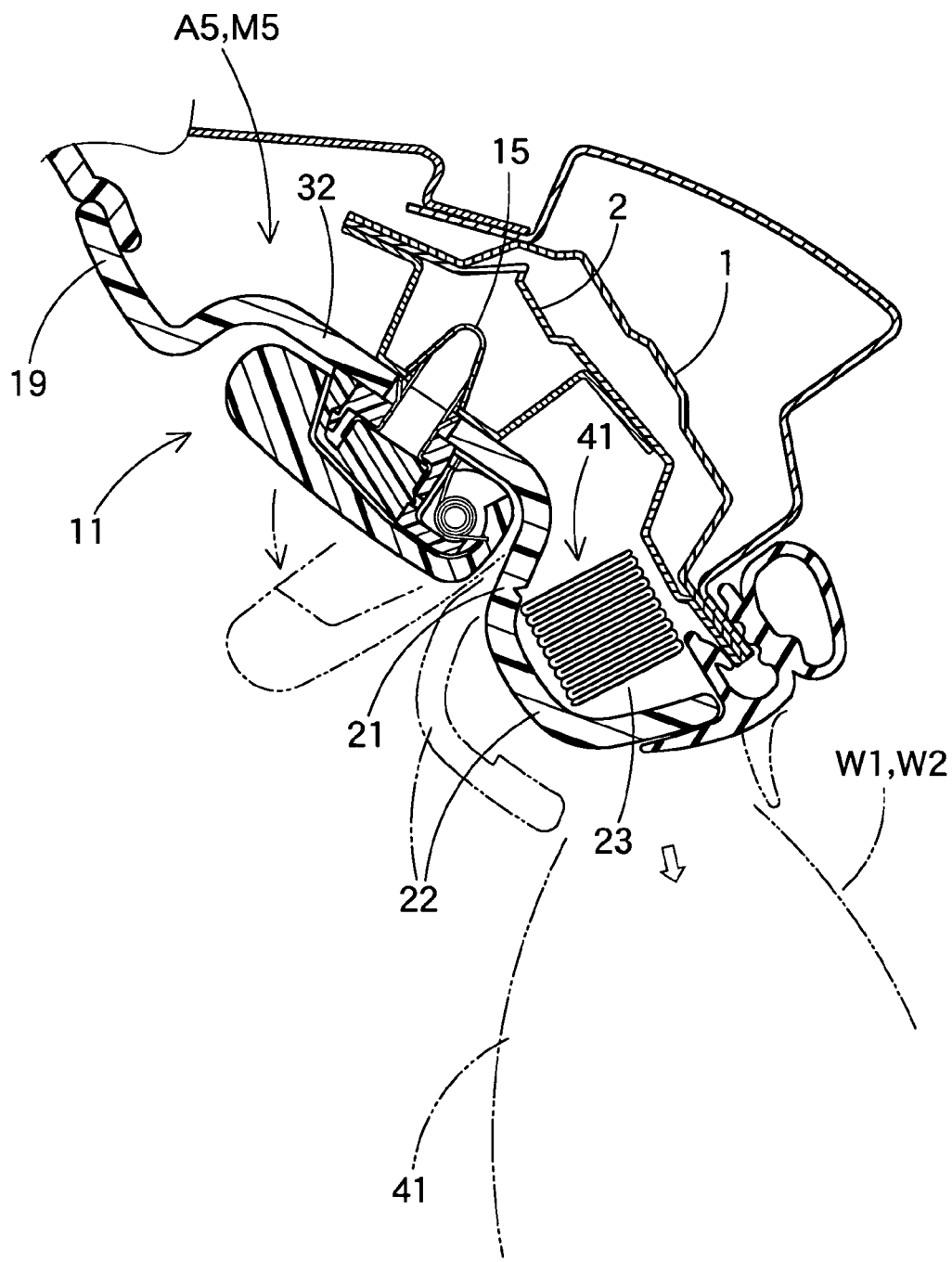
FIG. 21 is a partial vertical section of the fifth embodiment of the head-protecting airbag device in service, particularly showing a position where no cover portion is arranged.

Although the first embodiment show the cover portion 34 continuously formed over generally entire length of the roof rail garnish 19, the cover portion may be formed intermittently over the entire length of the garnish 19 on condition that the protection of the airbag 41 is secured, as a cover portion 34D in an airbag module A5 of a fifth embodiment of the head-protecting airbag device M5 shown in FIGS. 20 and 21. The airbag module A5 in the fifth embodiment has a similar construction to the first embodiment, except in that the cover portion 34D is formed intermittently in the back side 20*b* of the roof rail garnish 19, and therefore, common members and portions are designated by common reference numerals.

In the airbag module A5, the garnish 19 includes in predetermined positions in the back side 20*b* (near the longitudinal centers of side windows W1 and W2, in the illustrated embodiment) cover-free portions 23 where no cover portion 34D is located. Since there is no bottom wall 35 in the cover-free portions 23, the airbag 41 in the portions 23 is able to deploy downward swiftly to cover side windows W1 and W2 upon deployment of the airbag 41, without engaging the bottom wall 35 of the cover portion 34.

What is claimed is:

1. A head-protecting airbag device mountable on a vehicle, the device comprising:
    an airbag folded and arranged in upper edges of side windows inside a vehicle along front-rear direction;
    a roof rail garnish having a single plate shape located in an area extending in front-rear direction between a roof head lining of vehicle and side windows for covering an interior side of the folded airbag, the garnish being provided in a lower edge thereof with a door portion to be pushed by the airbag and open when an airbag deploys to cover the interior of side windows;
    an inflator for supplying inflation gas to the airbag; and
    a cover portion located on a back side of the roof rail garnish over generally the entire length of the folded airbag, wherein the cover portion is arranged intermittently over the entire length of the roof rail garnish, the cover portion comprising:
        a bottom wall for covering a lower side of the airbag from an exterior side of the door portion of the roof rail garnish up to the exterior of the folded airbag; and
        a side wall extending upward from an exterior end of the bottom wall for covering an exterior side of the airbag, an upper part of the side wall being joined to an upper and exterior portion of the roof rail garnish apart from the door portion and above the folded airbag,
    wherein the airbag, the roof rail garnish, the inflator and the cover portion are assembled into an airbag module to be mounted on a vehicle as a single part.

2. A head-protecting airbag device mountable on a vehicle, the device comprising:
    an airbag folded and arranged in upper edges of side windows inside a vehicle along front-rear direction;
    a roof rail garnish having a single plate shape located in an area extending in front-rear direction between a roof head lining of vehicle and side windows for covering an interior side of the folded airbag, the garnish being provided in a lower edge thereof with a door portion to be pushed by the airbag and open when an airbag deploys to cover the interior of side windows;
    an inflator for supplying inflation gas to the airbag; and
    a cover portion located on a back side of the roof rail garnish over generally the entire length of the folded airbag, wherein the cover portion is arranged intermittently over the entire length of the roof rail garnish, and wherein a cover-free portion between the intermittent cover portions is located in the vicinity of a longitudinal center of a side window above the side window, the cover portion comprising:
        a bottom wall for covering a lower side of the airbag from an exterior side of the door portion of the roof rail garnish up to the exterior of the folded airbag; and
        a side wall extending upward from an exterior end of the bottom wall for covering an exterior side of the airbag, an upper part of the side wall being joined to an upper and exterior portion of the roof rail, garnish apart from the door portion and above the folded airbag,
    wherein the airbag, the roof rail garnish, the inflator and the cover portion are assembled into an airbag module to be mounted on a vehicle as a single part.

3. A head-protecting airbag device mountable on a vehicle, the device comprising:
    an airbag folded and arranged in upper edges of side windows inside a vehicle along front-rear direction;
    a roof rail garnish having a single plate shape located in an area extending in front-rear direction between a roof head lining of vehicle and side windows for covering an interior side of the folded airbag, the garnish being provided in a lower edge thereof with a door portion to be pushed by the airbag and open when an airbag deploys to cover the interior of side windows;
    an inflator for supplying inflation gas to the airbag; and
    a cover portion located on a back side of the roof rail garnish over generally the entire length of the folded airbag, wherein the cover portion intermittently covers a lower side of the airbag such that cover-free portions are located intermittently along the length of the roof rail garnish to facilitate rapid deployment of the airbag, the cover portion comprising:
        a bottom wall for covering a lower side of the airbag from an exterior side of the door portion of the roof rail garnish up to the exterior of the folded airbag; and
        a side wall extending upward from an exterior end of the bottom wall for covering an exterior side of the airbag, an upper part of the side wall being joined to an upper and exterior portion of the roof rail garnish apart from the door portion and above the folded airbag,
    wherein the airbag, the roof rail garnish, the inflator and the cover portion are assembled into an airbag module to be mounted on a vehicle as a single part.

* * * * *